(12) United States Patent
Kato et al.

(10) Patent No.: US 10,106,196 B2
(45) Date of Patent: Oct. 23, 2018

(54) VEHICLE REAR SECTION STRUCTURE

(71) Applicant: TOYOTA JIDOSHA KABUSHIKI KAISHA, Toyota-shi, Aichi-ken (JP)

(72) Inventors: Hiroshi Kato, Toyota (JP); Yuji Nakane, Okazaki (JP); Yasuyuki Kumazawa, Miyoshi (JP); Masatoshi Hata, Toyota (JP); Osamu Shimasaki, Nisshin (JP); Takaaki Onodera, Toyota (JP); Shohei Hashiguchi, Toyota (JP); Hiroshi Amano, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/833,451

(22) Filed: Dec. 6, 2017

(65) Prior Publication Data

US 2018/0105210 A1  Apr. 19, 2018

Related U.S. Application Data

(63) Continuation of application No. 15/369,517, filed on Dec. 5, 2016, now Pat. No. 9,862,420.

(30) Foreign Application Priority Data

Dec. 25, 2015  (JP) ................................ 2015-254238

(51) Int. Cl.
  *B62D 21/08*  (2006.01)
  *B62D 21/15*  (2006.01)
  (Continued)

(52) U.S. Cl.
  CPC ............ *B62D 21/152* (2013.01); *B60R 19/02* (2013.01); *B62D 21/08* (2013.01); *B62D 25/08* (2013.01);
  (Continued)

(58) Field of Classification Search
  CPC .... B62D 21/08; B62D 21/152; B62D 21/155; B62D 25/08; B62D 25/087; B62D 25/2027; B62D 29/007; B60Y 2306/01
  (Continued)

(56) References Cited

U.S. PATENT DOCUMENTS 5,419,609 A     5/1995  Kmiec et al.
9,862,420 B2 *  1/2018  Kato .................. B62D 25/2027
(Continued)

FOREIGN PATENT DOCUMENTS

JP  2009-067376 A   4/2009
JP  2010-241176 A  10/2010
(Continued)

OTHER PUBLICATIONS

Sep. 28, 2017 Notice of Allowance issued in U.S. Appl. No. 15/369,517.

*Primary Examiner* — Gregory A Blankenship
(74) *Attorney, Agent, or Firm* — Oliff PLC

(57) ABSTRACT

A vehicle rear section structure includes: left and right rear side members disposed along a front-rear direction at width direction sides of a rear floor pan; a rear suspension member extending along the vehicle front-rear direction, and attached to front portions of left and right rear side members; a load bearing section projecting upwardly from the rear suspension member; left and right reinforcement members extending along the vehicle front-rear direction, and disposed at a vehicle width direction inner side of rear portions of the left and right rear side members and at a vehicle rear side of the rear suspension member, a rear end portion of the reinforcement member partially overlapping a rear bumper reinforcement in a vehicle front-rear direction view; and a rear cross member linking the left and right rear side
(Continued)

members together and partially overlapping the load bearing section in the vehicle front-rear direction view.

5 Claims, 24 Drawing Sheets

(51) Int. Cl.
*B62D 25/08* (2006.01)
*B62D 25/20* (2006.01)
*B60R 19/02* (2006.01)
*B62D 29/00* (2006.01)

(52) U.S. Cl.
CPC ....... *B62D 25/087* (2013.01); *B62D 25/2027* (2013.01); *B62D 29/007* (2013.01); *B60Y 2306/01* (2013.01)

(58) Field of Classification Search
USPC .... 296/203.04, 204, 187.08, 187.11, 193.07, 296/193.08
See application file for complete search history.

(56) References Cited

U.S. PATENT DOCUMENTS

| | | |
|---|---|---|
| 2006/0214414 A1 | 9/2006 | Wehner et al. |
| 2010/0052368 A1 | 3/2010 | Yamaguchi et al. |
| 2011/0175401 A1 | 7/2011 | Fujimura |
| 2011/0215617 A1 | 9/2011 | Izutsu et al. |
| 2011/0227367 A1 | 9/2011 | Funakoshi |
| 2013/0249243 A1 | 9/2013 | Lee et al. |
| 2016/0052556 A1 | 2/2016 | Kano et al. |
| 2017/0057548 A1 | 3/2017 | Yamada et al. |
| 2017/0183037 A1 | 6/2017 | Kato et al. |
| 2017/0259851 A1* | 9/2017 | Higuchi ................. B62D 21/15 |
| 2018/0037270 A1* | 2/2018 | Kawabe ................. B62D 25/08 |
| 2018/0065671 A1* | 3/2018 | Yoshimura ............. B60R 19/34 |
| 2018/0127030 A1* | 5/2018 | Hanaoka ............... B62D 25/025 |

FOREIGN PATENT DOCUMENTS

| | | |
|---|---|---|
| JP | 2010-241393 A | 10/2010 |
| JP | 2012-081877 A | 4/2012 |

* cited by examiner

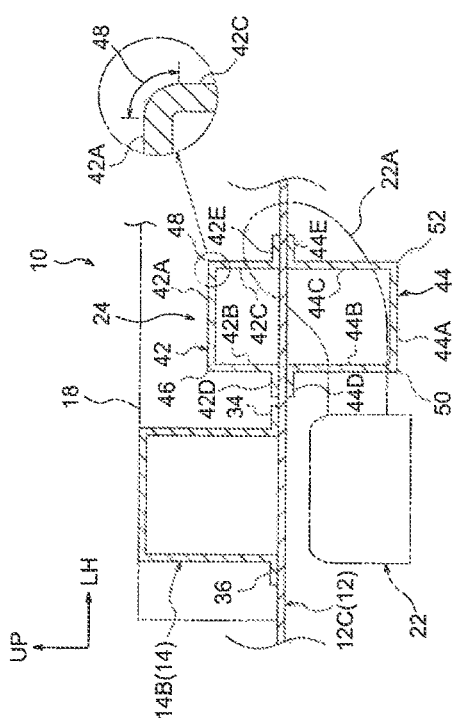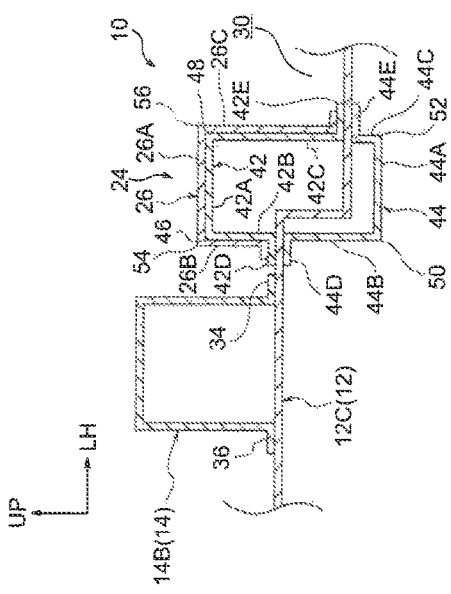

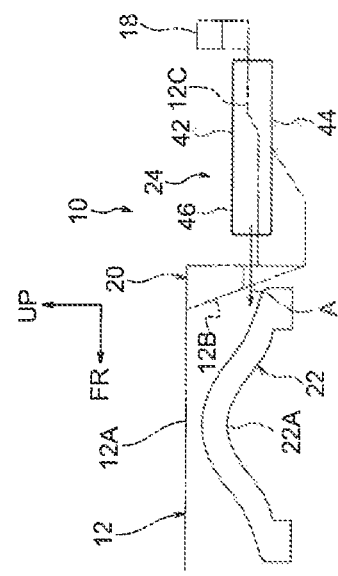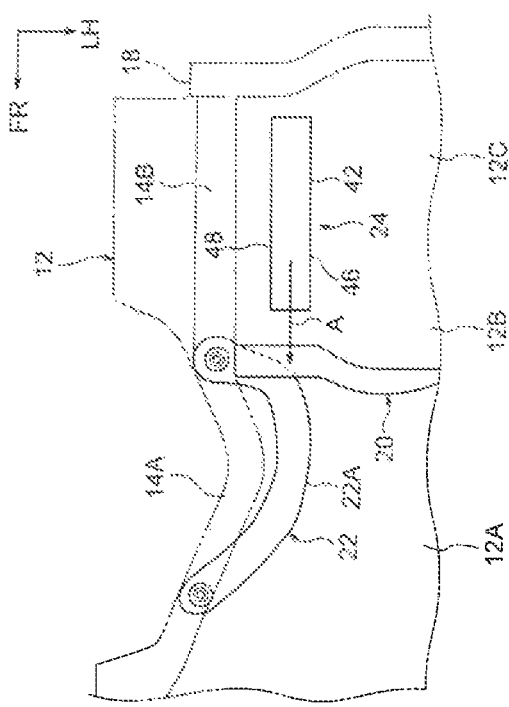

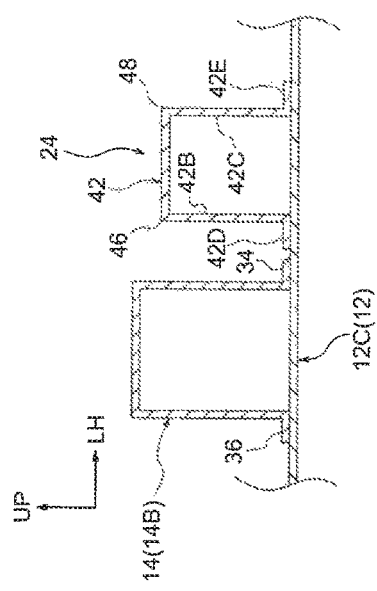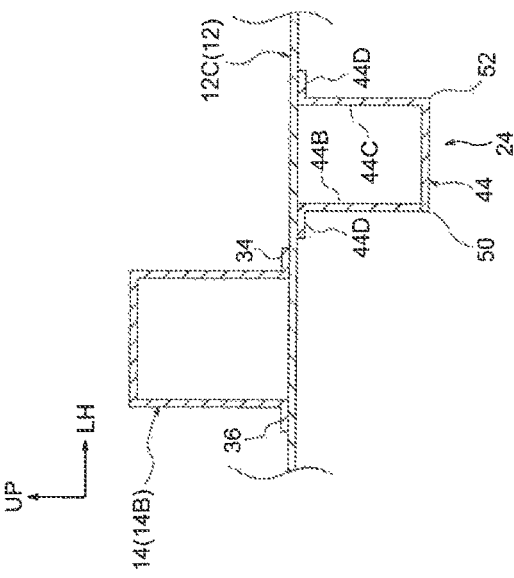

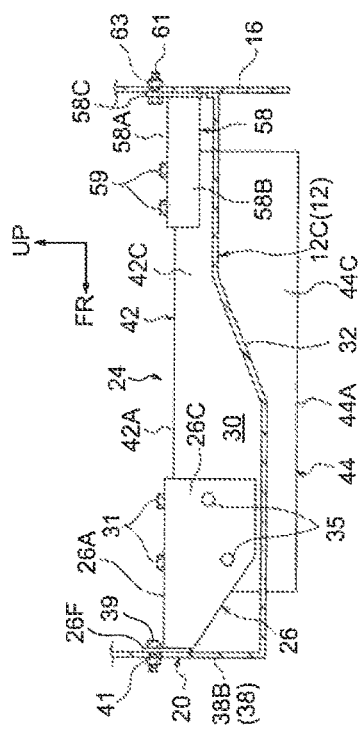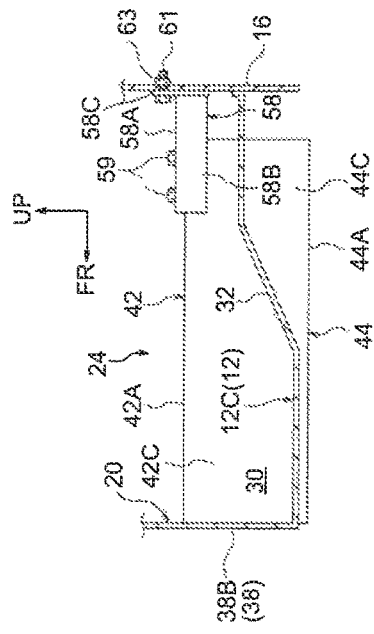

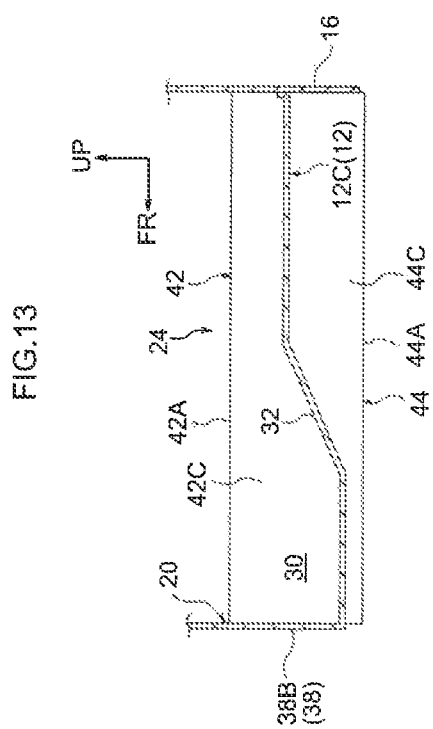

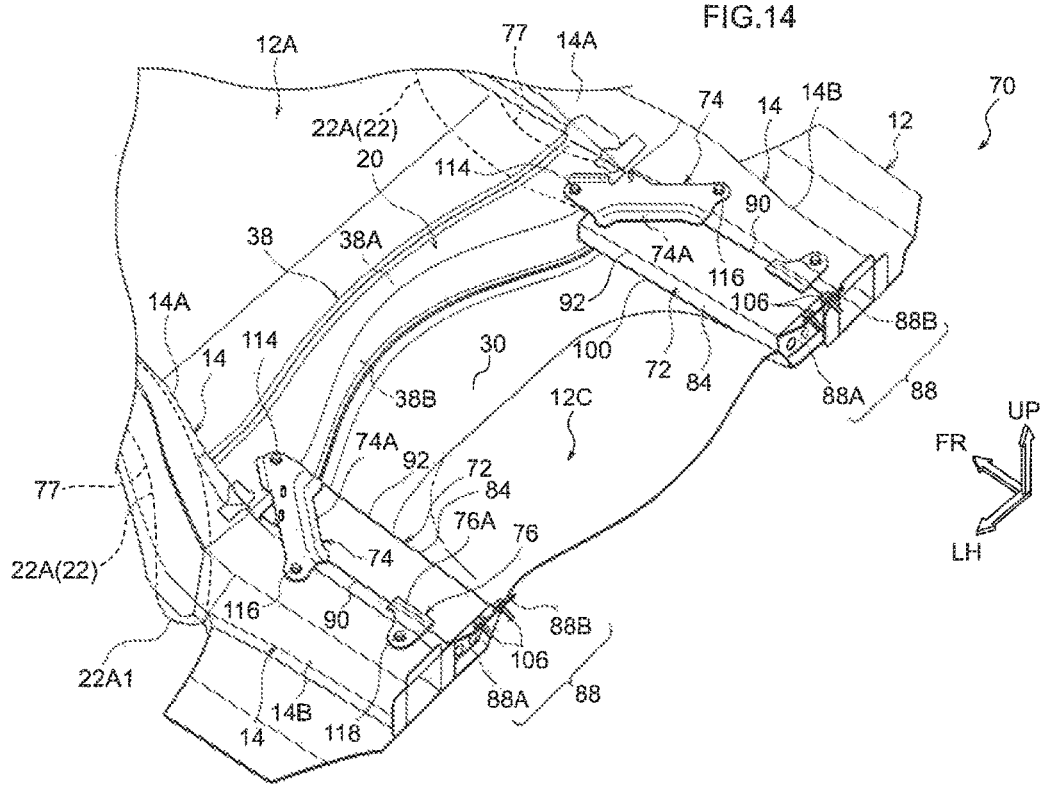

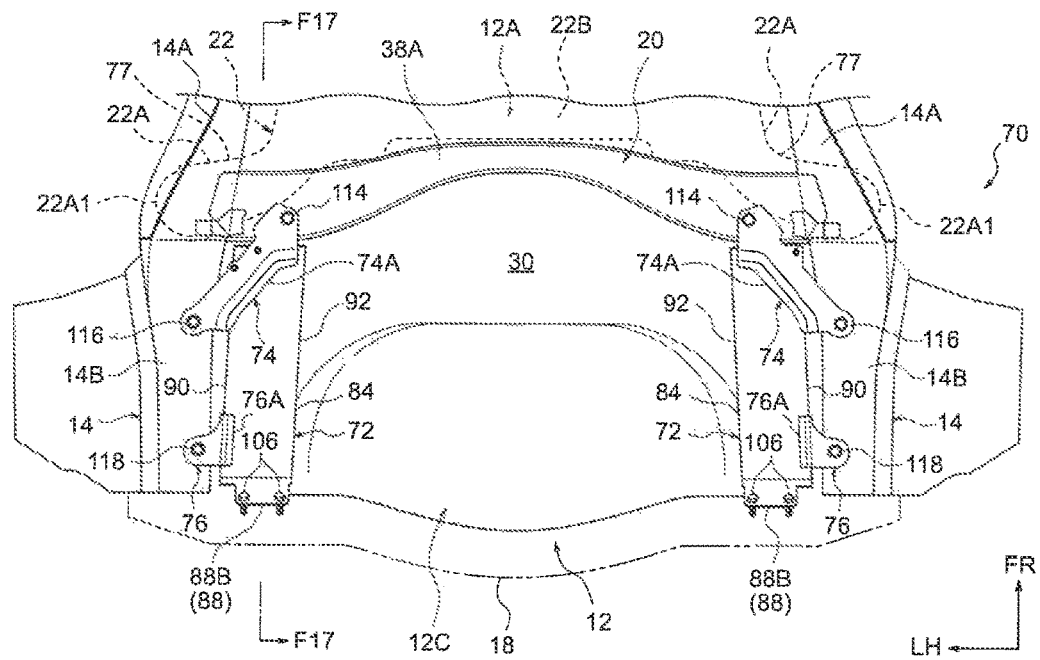

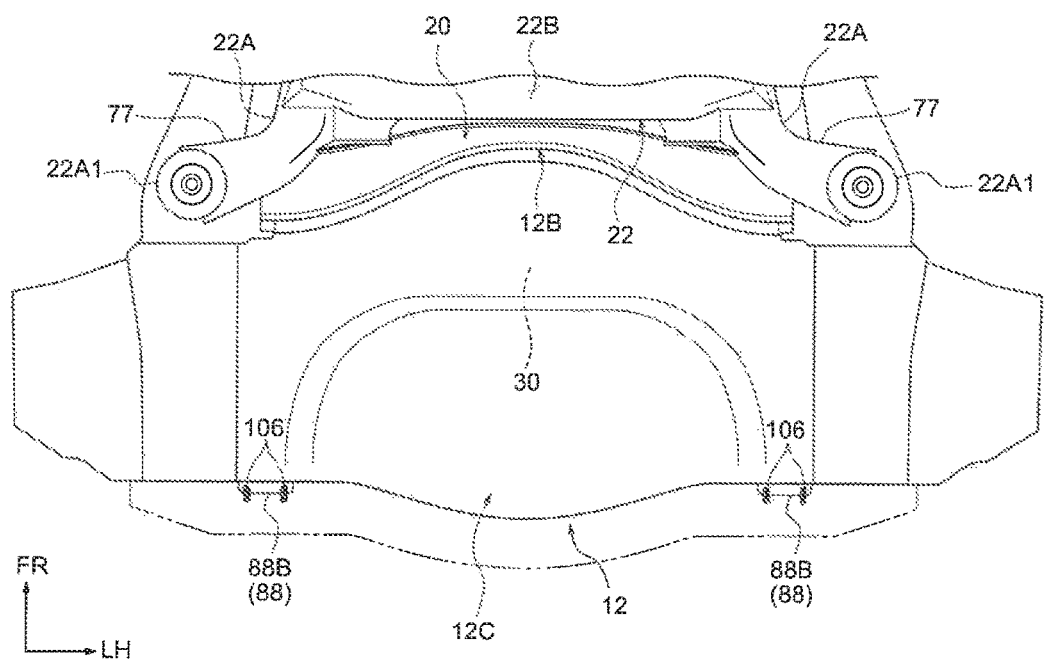

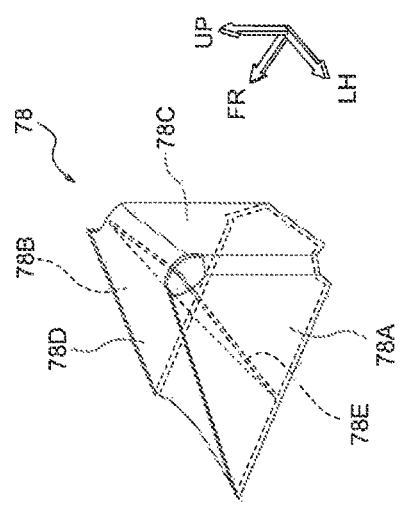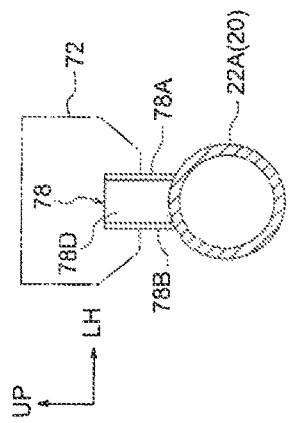

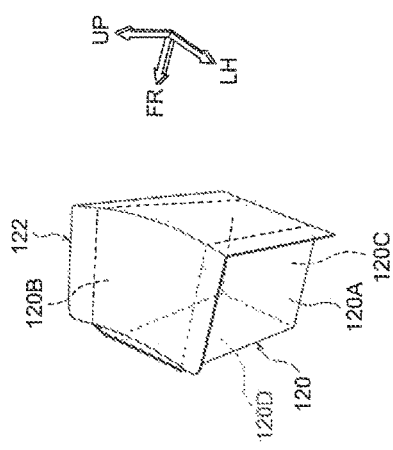
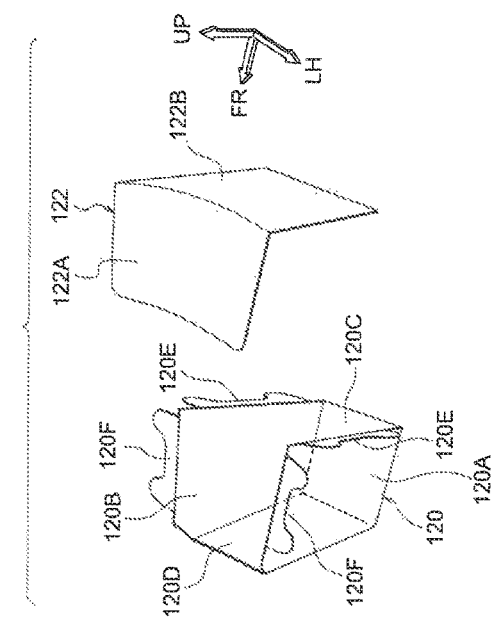
FIG.19A
FIG.19B

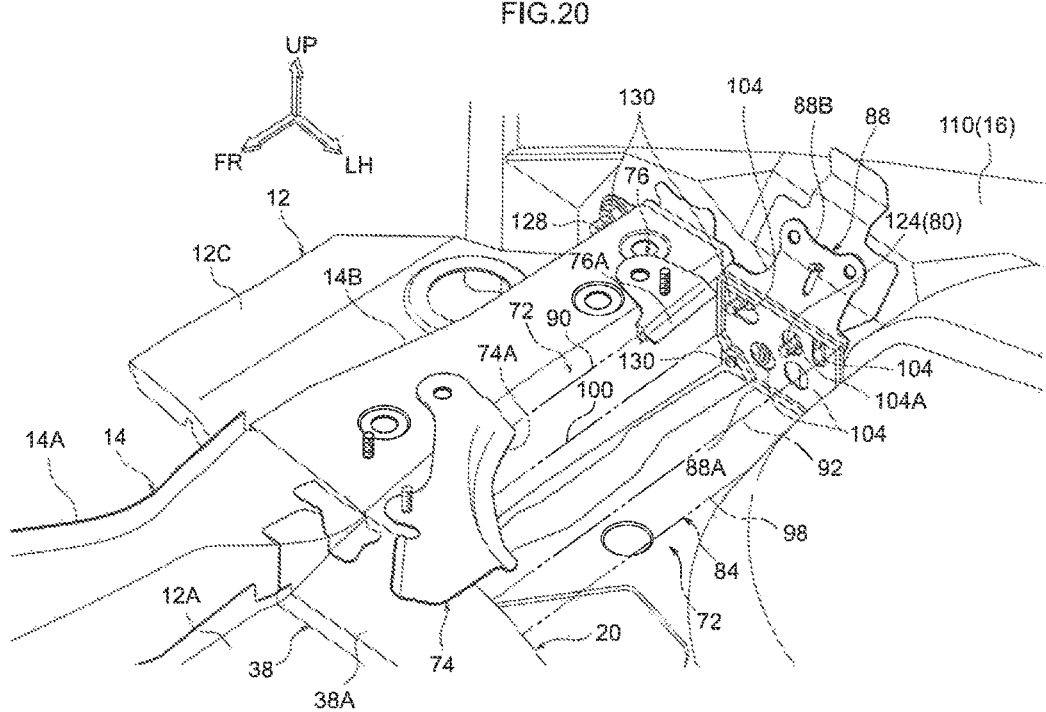

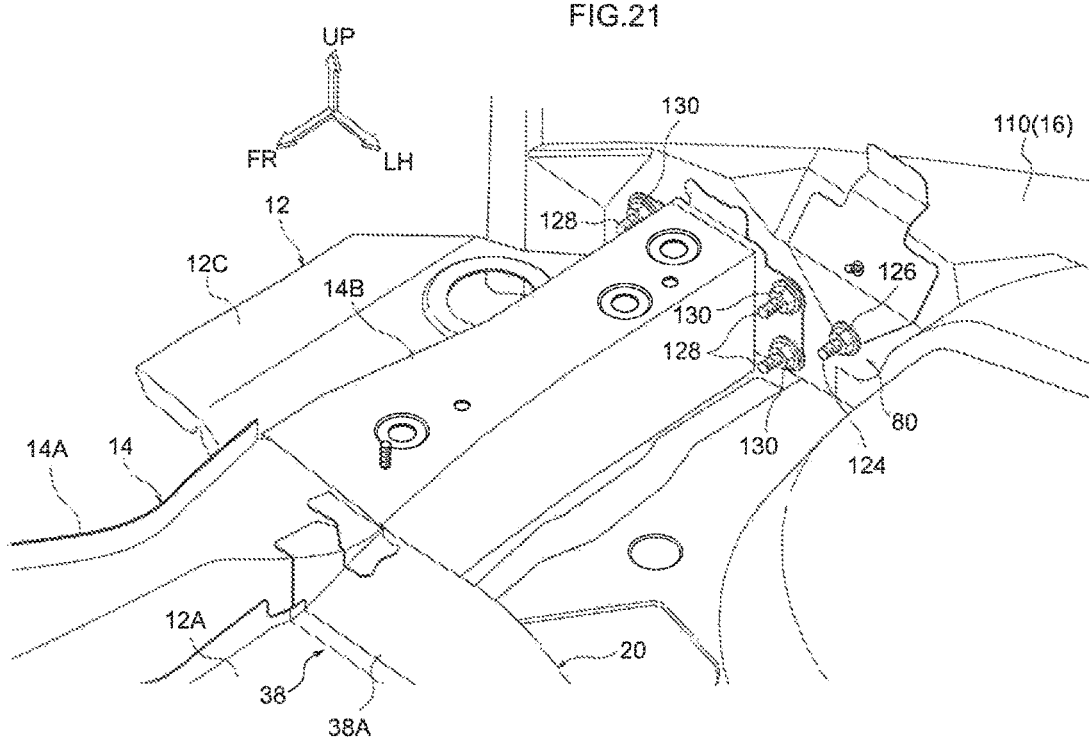

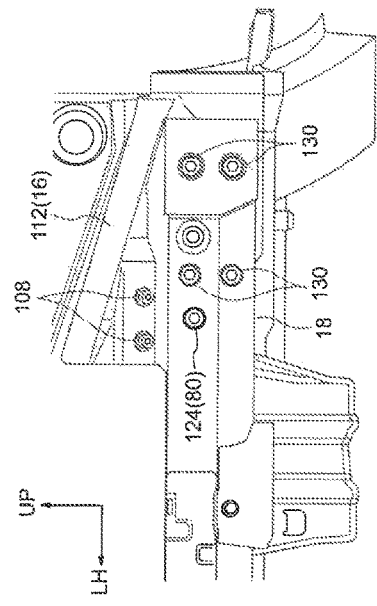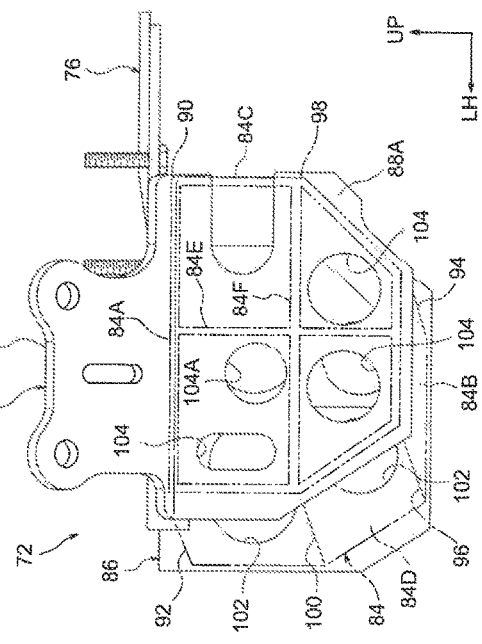

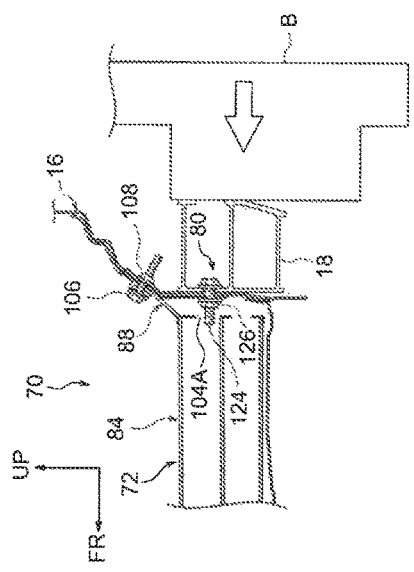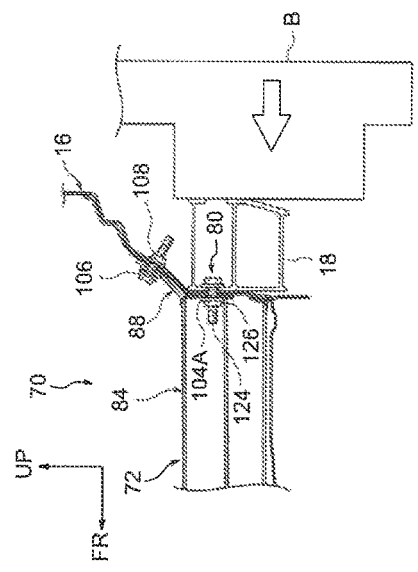

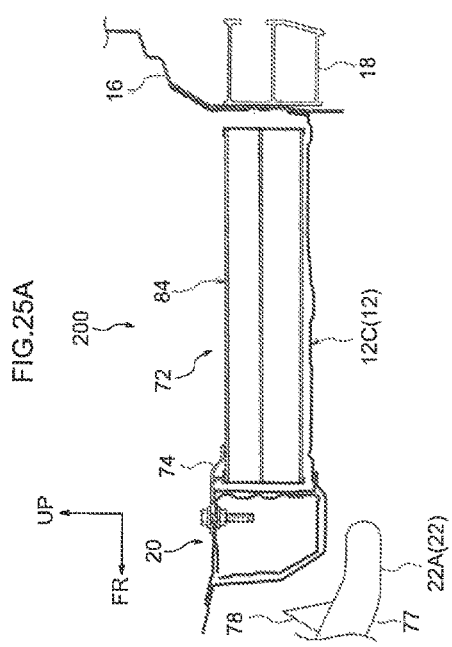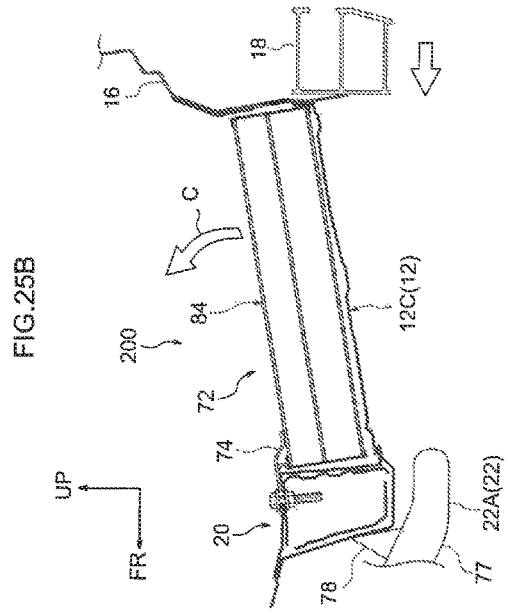

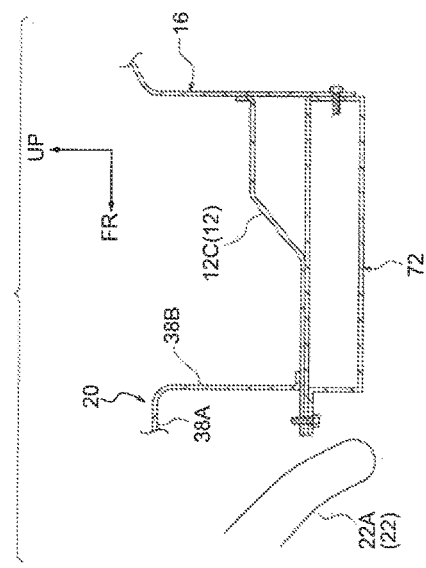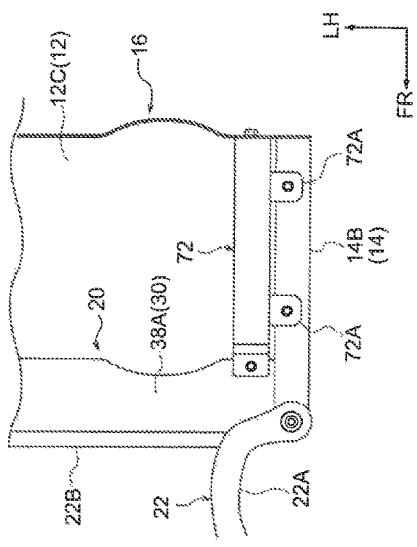

VEHICLE REAR SECTION STRUCTURE

CROSS-REFERENCE TO RELATED APPLICATION

This is a Continuation of U.S. patent application Ser. No. 15/369,517 filed Dec. 5, 2016, which is based on and claims priority under 35 USC 119 from Japanese Patent Application No. 2015-254238 filed on Dec. 25, 2015. The disclosures of each of the above-identified applications are incorporated by reference herein in their entireties.

BACKGROUND

Technical Field

The present disclosure relates to a vehicle rear section structure.

Related Art

In a vehicle rear section structure described in Japanese Patent Application Laid-Open (JP-A) No. 2010-241176, a floor frame is provided with its length direction along the vehicle front-rear direction at a lower portion of a front floor, and a center frame is provided with its length direction along the vehicle front-rear direction at a bottom portion of a spare tire pan. A rear end portion of the floor frame and a front end portion of the center frame are coupled together by an assembly-type reinforcement bar. Thus, collision load during a rear-end collision (hereafter referred to as "rear collision load") is transmitted toward the vehicle front side.

However, in the vehicle rear section structure configured as described above, a cross-section profile of the bottom portion of the spare tire pan (rear floor pan) viewed from the vehicle width direction bends so as to protrude toward the lower side, and the center frame bends along the cross-section profile of the bottom portion. Thus, the efficiency of load transmission toward the vehicle front side is reduced due to the center frame folding (buckling) under rear collision load.

SUMMARY

In consideration of the above circumstances, the present disclosure provides a vehicle rear section structure capable of efficiently transmitting rear collision load toward the vehicle front side.

A first aspect of the present disclosure is a vehicle rear section structure including: left and right rear side members that are disposed with length directions along a vehicle front-rear direction at both vehicle width direction sides of a rear floor pan; a rear suspension member that includes left and right side sections disposed with length directions along the vehicle front-rear direction, both front and rear end portions of the left and right side sections being attached to respective front portions of the left and right rear side members; and left and right reinforcement members having length directions along the vehicle front-rear direction, the left and right reinforcement members being disposed at a vehicle width direction inner side of rear portions of the left and right side members and at a vehicle rear side of the rear suspension member, each of the left and right reinforcement members including a ridgeline section extending in a straight line along the vehicle front-rear direction from a front end portion across to a rear end portion of the reinforcement member, at least part of the respective front end portion of the reinforcement member overlapping the respective left or right side section of the rear suspension member in a vehicle front-rear direction view.

In the first aspect, when a rear-end collision occurs, rear collision load is input to the left and right rear side members, and to the left and right reinforcement members disposed at the vehicle width direction inner side of the left and right rear side members. The left and right reinforcement members are disposed with their length direction along the vehicle front-rear direction at the vehicle rear side of the rear suspension member, and each have at least part of the respective front end portion overlapping the respective left or right side section of the rear suspension member in a vehicle front-rear direction view. Thus, the left and right reinforcement members engage with (directly or indirectly abut) the left and right side sections of the rear suspension member from the vehicle rear side, such that rear collision load is transmitted toward the vehicle front side through the left and right reinforcement members and the left and right side sections of the rear suspension member. Since the reinforcement members are each formed with the ridgeline section extending in a straight line shape along the vehicle front-rear direction from the front end portion across to the rear end portion, rigidity against rear collision load is increased, thereby enabling rear collision load to be efficiently transmitted toward the vehicle front side.

The present aspect may further include rear bumper reinforcement that is disposed with a length direction along the vehicle width direction at the vehicle rear side of rear end portions of the left and right rear side members, wherein at least part of each of the rear end portions of the left and right reinforcement members overlaps the rear bumper reinforcement in a vehicle front-rear direction view.

In the above configuration, rear collision load input to the rear bumper reinforcement is distributed and input to the left and right rear side members and to the left and right reinforcement members. This enables the number of transmission paths toward the vehicle front side for rear collision load input to the rear bumper reinforcement to be increased.

The present aspect may further include a rear cross member that links respective front-rear direction intermediate portions of the left and right rear side members together in the vehicle width direction, the rear cross member interposing between the left and right reinforcement members and the left and right side sections.

In the above configuration, the rear cross member is interposed between the left and right reinforcement members and the left and right side sections of the rear suspension member. Thus, rear collision load input to the left and right reinforcement members is transmitted to the left and right side sections of the rear suspension member through the rear cross member. This enables rear collision load to be transmitted to the left and right side sections at an earlier stage than in cases in which there is no rear cross member interposed between the left and right reinforcement members and the left and right side sections.

The present aspect may be configured such that the left and right reinforcement members include left and right above-floor reinforcement members that are joined to an upper face of the rear floor pan; and left and right under-floor reinforcement members that are joined to a lower face of the rear floor pan.

In the above configuration, as described above, the left and right reinforcement members include the left and right above-floor reinforcement members joined to the upper face of the rear floor pan, and the left and right under-floor reinforcement members joined to the lower face of the rear floor pan. This enables the ridgeline sections to be formed in straight line shapes as previously described, irrespective of the shape of the rear floor pan, at locations at the opposite side of the above-floor reinforcement members and the under-floor reinforcement members to the rear floor pan (locations at upper end portions of the above-floor reinforcement members and lower end portions of the under-floor reinforcement members). This enables the number of ridgeline sections formed in straight line shapes on the left and right reinforcement members to be increased compared to cases in which the left and right reinforcement members are joined only to the upper face of the rear floor pan, or only to the lower face of the rear floor pan.

The present aspect may further include left and right front brackets that couple the respective front end portions of the left and right reinforcement members and the rear cross member together.

In the above configuration, rear collision load input to the left and right reinforcement members is transmitted to the rear cross member through the left and right front brackets. This enables rear collision load to be transmitted to the rear cross member at an earlier stage.

The present aspect may further include a lower back that is joined to a rear end portion of the rear floor pan; and left and right rear brackets that couple the respective rear end portions of the left and right reinforcement members and the lower back together.

In the above configuration, rear collision load input to the lower back is input to the left and right reinforcement members through the left and right rear brackets. This enables rear collision load to be transmitted to the left and right reinforcement members at an earlier stage.

The present aspect may further include a rear cross member that links respective front-rear direction intermediate portions of the left and right rear side members together in the vehicle width direction, the rear cross member supporting the respective front end portions of the left and right reinforcement members; and a lower back that is joined to a rear end portion of the rear floor pan, the lower back supporting the respective rear end portions of the left and right reinforcement members, wherein the left and right reinforcement members are not being joined to the rear floor pan.

In the above configuration, the left and right reinforcement members are supported by the rear cross member and the lower back. Since the left and right reinforcement members are not joined to the rear floor pan, the shape of the left and right reinforcement members can be set irrespective of the shape of the rear floor pan. This enables the number of ridgeline sections formed in straight line shapes as previously described on the left and right reinforcement members to be increased, compared to cases in which the left and right reinforcement members are joined to the rear floor pan.

The present aspect may further include left and right coupling sections that couple the respective reinforcement members to the respective rear side members positioned at the vehicle width direction outer side of the respective reinforcement members.

In the above configuration, the respective reinforcement members are coupled to the respective rear side members positioned at the vehicle width direction outer side of the respective reinforcement members by the left and right coupling sections. The respective rear side members and the respective reinforcement members thereby reinforce each other, enabling rigidity of the vehicle body to be improved.

The present aspect may further include left and right projection sections that project out from one of the rear bumper reinforcement or the respective rear end portions of the left and right reinforcement members toward a side of the other of the rear bumper reinforcement or the respective rear end portions of the left and right reinforcement members, wherein the respective rear end portions of the left and right reinforcement members being positioned separated from and at the vehicle front side of the rear bumper reinforcement; and left and right hole sections that are each formed in the other of the rear bumper reinforcement or the respective rear end portions of the left and right reinforcement members, the respective left or right projection section being inserted into the respective left and right hole sections at least when the rear bumper reinforcement has been displaced toward the respective left and right reinforcement member side under collision load in a rear-end collision.

In the above configuration, the rear end portions of the left and right reinforcement members are positioned separated from the rear bumper reinforcement toward the vehicle front side. When at least the rear bumper reinforcement has been displaced toward the left and right reinforcement member side under rear collision load, the left and right projection portions, which project out from one of the rear bumper reinforcement or the respective rear end portions of the left and right reinforcement members toward the side of the other of the rear bumper reinforcement or the respective rear end portions of the left and right reinforcement members, are inserted into the left and right hole sections formed in the other of the rear bumper reinforcement or the respective rear end portions of the left and right reinforcement members. This enables positional misalignment of the left and right reinforcement members and the rear bumper reinforcement due to rear collision load to be prevented or reduced, thereby enabling rear collision load input to the rear bumper reinforcement to be well transmitted to the left and right reinforcement members. Moreover, since the above-described positional misalignment is prevented or reduced, there is no need to directly couple the left and right reinforcement members and the rear bumper reinforcement together, thereby making the assembly operation of the left and right reinforcement members to the vehicle rear section easier.

The present aspect may further include a lower back that is joined to a rear end portion of the rear floor pan, wherein the rear bumper reinforcement is disposed at the vehicle rear side of the lower back, and wherein the left and right projection sections include fastener fastening the lower back and the rear bumper reinforcement together.

In the above configuration, positional misalignment between the rear bumper reinforcement and the left and right reinforcement members during a rear-end collision is prevented or reduced using the fastener fastening the lower back and the rear bumper reinforcement together. This enables the configuration for preventing or reducing the above-described positional misalignment to be simplified.

The present aspect may be configured such that the left and right side sections include left and right side section main bodies that includes both front and rear end portions being attached to the respective front portions of the left and right rear side members, and left and right load bearing sections that respectively project out from the left and right side section main bodies; and at least part of each of the front end portions of the left and right reinforcement members overlaps the respective left or right load bearing section in a vehicle front-rear direction view.

In the above configuration, when the left and right reinforcement members approach the left and right side sections of the rear suspension member under rear collision load, the left and right reinforcement members engage with the left and right load bearing sections. Rear collision load is thereby transmitted from the left and right reinforcement members to the left and right side sections of the rear suspension member. The left and right load bearing sections respectively project out from the left and right side section main bodies, these being main bodies of the left and right side sections. Thus, load can be transmitted from the left and right reinforcement members to the left and right side sections, even, for example, in cases in which it is difficult to dispose the left and right reinforcement members such that the respective front end portions of the left and right reinforcement members overlap with the left and right side section main bodies in a vehicle front-rear direction view. This increases the degrees of freedom for placement of the left and right reinforcement members.

The present aspect may further include left and right bulk members that are provided inside a closed cross-section and that are respectively interposed between the left and right reinforcement members and the left and right side sections, wherein the closed cross-section is formed by the rear cross member and is extending along the vehicle width direction.

In the above configuration, when rear collision load input to the left and right reinforcement members is transmitted to the left and right side sections of the rear suspension member through the rear cross member, the left and right bulk members can suppress the closed cross-section of the rear cross member from being crushed. This enables the transmission efficiency of rear collision load through the rear cross member to be improved.

As explained above, the vehicle rear section structure according to the present disclosure enables rear collision load to be efficiently transmitted toward the vehicle front side.

BRIEF DESCRIPTION OF THE DRAWINGS

Exemplary embodiments of the present disclosure will be described in detail based on the following figures, wherein:

FIG. 5 is an enlarged, schematic cross-section sectioned along line F5-F5 in FIG. 2;

FIG. 6 is an enlarged, schematic cross-section sectioned along line F6-F6 in FIG. 2;

FIG. 7 is an outline lateral cross-section for explaining transmission of rear collision load from a reinforcement member to a rear suspension member in the vehicle rear section structure according to the first exemplary embodiment;

FIG. 8 is an outline plan view for explaining transmission of rear collision load from the reinforcement member to the rear suspension member in a vehicle rear section structure according to the first exemplary embodiment;

FIG. 9 is a cross-section corresponding to FIG. 5, illustrating configuration surrounding a reinforcement member according to a first modified example of the first exemplary embodiment;

FIG. 10 is a cross-section corresponding to FIG. 5, illustrating configuration surrounding a reinforcement member according to a second modified example of the first exemplary embodiment;

FIG. 11 is a cross-section schematically illustrating configuration surrounding a reinforcement member according to a third modified example of the first exemplary embodiment, in a state viewed from the vehicle left side;

FIG. 12 is a cross-section schematically illustrating configuration surrounding a reinforcement member according to a fourth modified example of the first exemplary embodiment, in a state viewed from the vehicle left side;

FIG. 13 is a cross-section schematically illustrating configuration surrounding a reinforcement member according to a fifth modified example of the first exemplary embodiment, in a state viewed from the vehicle left side;

FIG. 14 is a perspective view illustrating configuration of relevant portions of a vehicle rear section structure according to a second exemplary embodiment of the present disclosure in a state viewed diagonally from a vehicle rear upper left side;

FIG. 15 is a plan view illustrating configuration of relevant portions of the vehicle rear section structure according to the second exemplary embodiment;

FIG. 16 is a bottom view illustrating configuration of relevant portions of the vehicle rear section structure according to the second exemplary embodiment;

FIG. 18A is a perspective view illustrating configuration of a load bearing section included in a rear suspension member of the vehicle rear section structure according to the second exemplary embodiment;

FIG. 18B is a schematic view illustrating a reinforcement member and the load bearing section in a state viewed from the vehicle front side;

FIG. 19A is a perspective view illustrating configuration of a bulk member of the vehicle rear section structure according to the second exemplary embodiment;

FIG. 19B is an exploded perspective view of the bulk member;

FIG. 20 is an enlarged perspective view illustrating configuration surrounding of a reinforcement member at the vehicle right side of a vehicle rear section structure according to the second exemplary embodiment, in a state in which a main section of the reinforcement member is transparent;

FIG. 21 is a perspective view of the configuration illustrated in FIG. 20, from which illustration of the reinforcement member is omitted;

FIG. 22 is a back view of a vehicle right side section of the vehicle rear section structure according to the second exemplary embodiment, as viewed from the vehicle rear side;

FIG. 23 is a back view of the reinforcement member according to the second exemplary embodiment, as viewed from the vehicle rear;

FIG. 24A is cross-section of the vehicle rear section structure according to the second exemplary embodiment, in a condition in which a barrier has been in a rear-end collision with the rear bumper reinforcement as viewed from the vehicle left side;

FIG. 24B is a cross-section corresponding to FIG. 22A, illustrating a state in which a fastener that fastens the rear bumper reinforcement and a lower back together has been inserted through a through-hole formed in the reinforcement member;

FIG. 25A is a cross-section corresponding to part of FIG. 17, illustrating a vehicle rear section structure according to a comparative example;

FIG. 25B is a cross-section corresponding to FIG. 23A, illustrating a state in which a reinforcement member has been raised upward toward the vehicle upper side under rear collision load in the vehicle rear section structure according to the comparative example;

FIG. 27A is cross-section schematically illustrating configuration surrounding a reinforcement member according to a second modified example of the second exemplary embodiment, in a state viewed from the vehicle left side;

FIG. 27B is a bottom view schematically illustrating configuration surrounding the reinforcement member according to the second modified example of the second exemplary embodiment, in a state viewed from the vehicle lower side;

DETAILED DESCRIPTION

First Exemplary Embodiment

Figure 1:
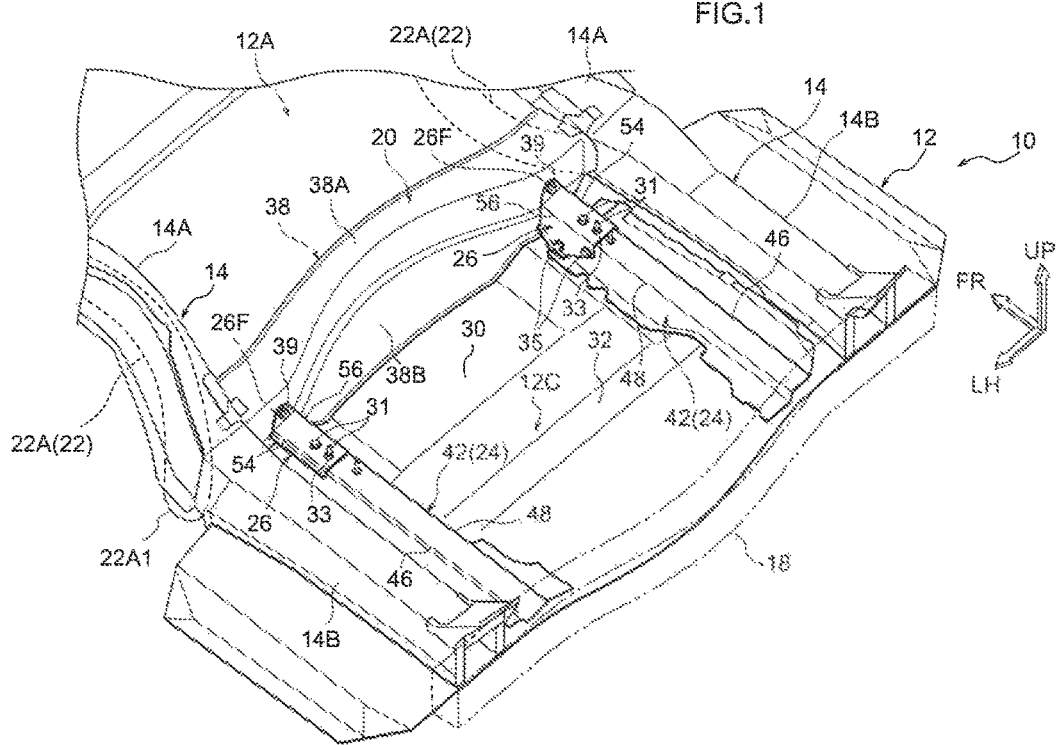
FIG. 1 is a perspective view illustrating configuration of relevant portions of a vehicle rear section structure according to a first exemplary embodiment of the present disclosure in a state viewed diagonally from a vehicle rear upper left side.

Explanation follows regarding a vehicle rear section structure 10 according to a first exemplary embodiment of the present disclosure, based on FIGS. 1 to 13. Note that in each of the drawings, the arrow FR, the arrow UP and the arrow LH respectively indicate the front direction (the direction of progress of the vehicle), upper direction, and left direction (one vehicle width direction) of a vehicle body. Unless specifically stated otherwise, simple reference to the front and rear, left and right, and up and down directions refers to front and rear in the vehicle front-rear direction, left and right in the vehicle left-right direction (vehicle width direction), and up and down in the vehicle vertical direction.

Configuration

As illustrated in FIGS. 1 to 4, the vehicle rear section structure 10 according to the first exemplary embodiment of the present disclosure includes a rear floor pan 12, a left and right pair of rear side members 14, a lower back 16 (not illustrated other than in FIG. 4), rear bumper reinforcement 18, a rear cross member 20, a rear suspension member 22, a left and right pair of reinforcement members 24, and a left and right pair of front brackets 26. Note that, since the vehicle rear section structure 10 is configured with left-right symmetry, explanation may be provided only regarding configuration of one of the left or right sides, and explanation regarding the other of the left or right sides may be omitted. Members that have left-right symmetry are appended with the same reference numerals in each of the drawings. Some reference numerals may be omitted in each of the drawings. Explanation follows regarding each of the above configuration elements.

Rear Floor Pan 12

Figure 2:
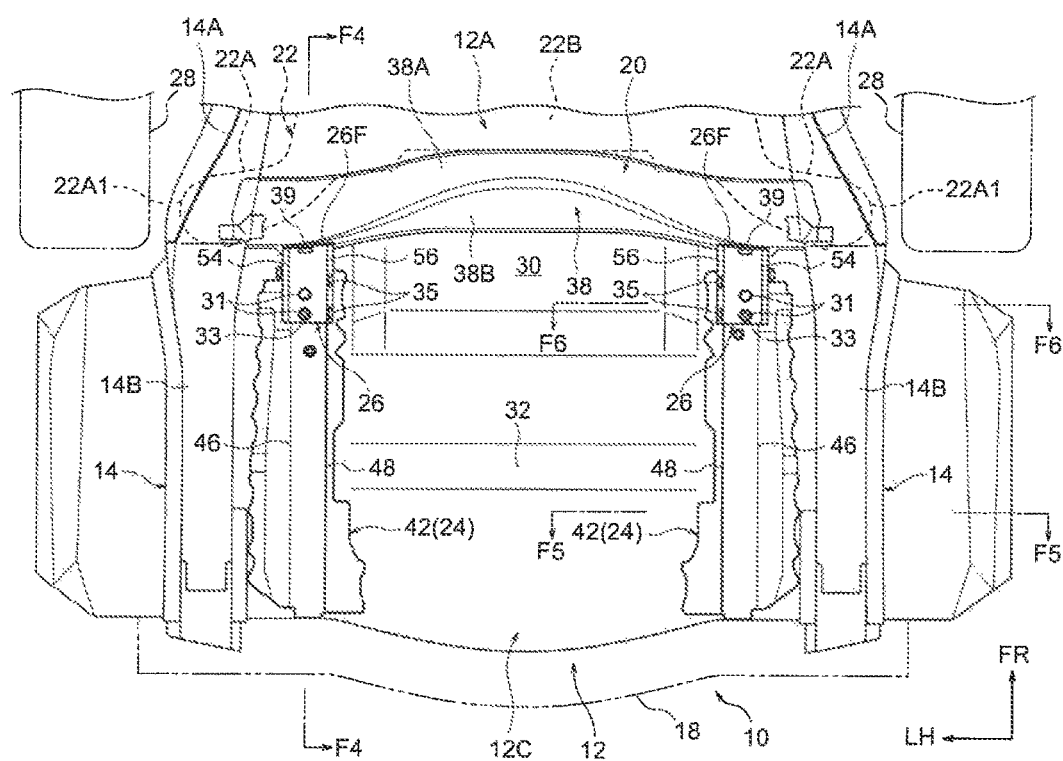
FIG. 2 is a plan view illustrating configuration of relevant portions of the vehicle rear section structure according to the first exemplary embodiment.
Figure 3:
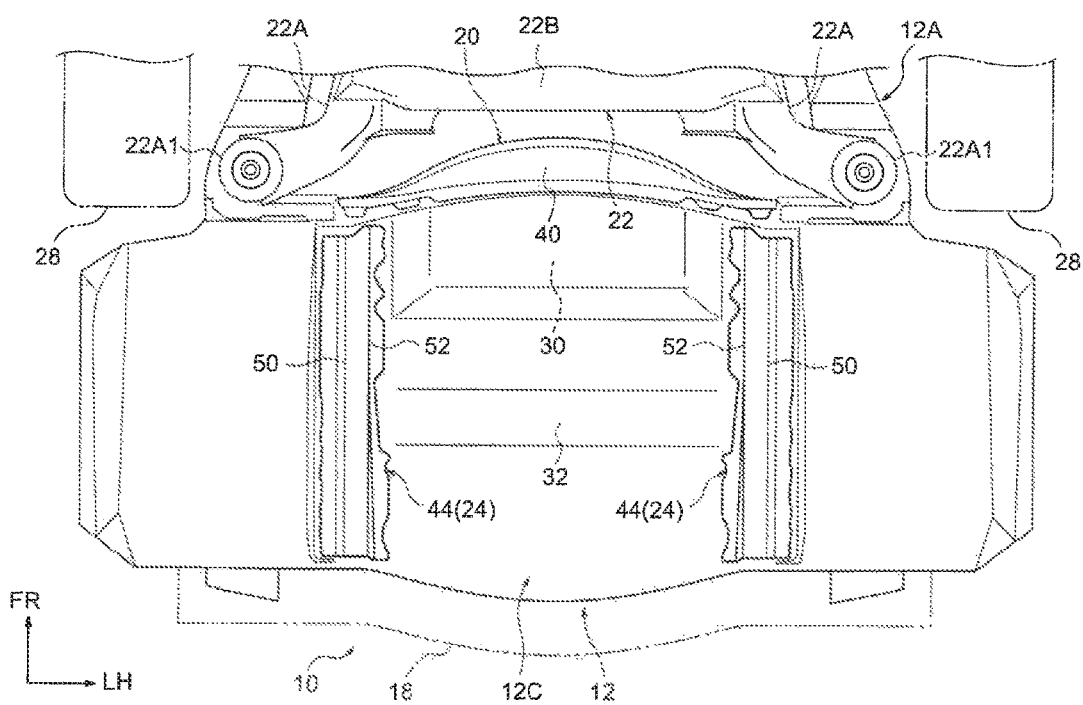
FIG. 3 is a bottom view illustrating configuration of relevant portions of the vehicle rear section structure according to the first exemplary embodiment.

The rear floor pan 12, also referred to as a rear floor panel, configures a floor surface of a vehicle rear section. As illustrated in FIGS. 2 and 3, the rear floor pan 12 includes a rear floor pan front section 12A positioned between left and right rear tires 28 as viewed from the vehicle vertical direction, a rear floor pan rear section 12C positioned further toward the vehicle rear side than the rear floor pan front section 12A, and a rear floor pan intermediate section 12B positioned between the rear floor pan front section 12A and the rear floor pan rear section 12C (see FIG. 4). The rear floor pan rear section 12C configures a floor surface of a luggage space.

The rear floor pan front section 12A and the rear floor pan rear section 12C each extend along the vehicle front-rear direction and the vehicle width direction. The rear floor pan rear section 12C is positioned further toward the vehicle lower side than the rear floor pan front section 12A, and is formed with a wider width in the vehicle width direction than the rear floor pan front section 12A. A recessed section 30 is formed open toward the vehicle upper side at a front portion side and vehicle width direction center side of the rear floor pan rear section 12C, A sloped section 32 is formed sloping upward toward the vehicle rear side at a vehicle rear side of the recessed section 30.

Figure 4:
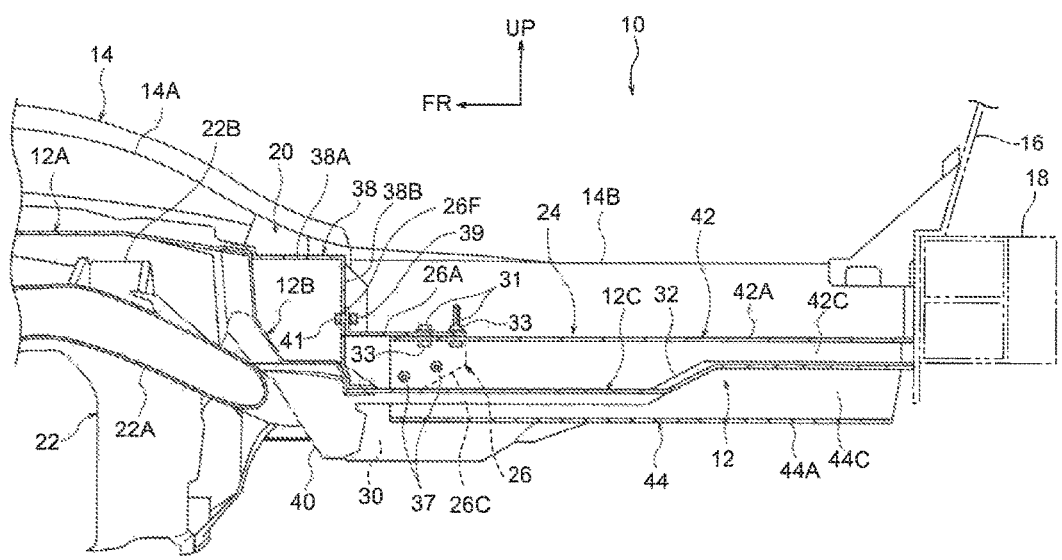
FIG. 4 is an enlarged cross-section sectioned along line F4-F4 in FIG. 2.

As illustrated in FIG. 4, the rear floor pan intermediate section 12B is formed with a substantially L-shaped cross-section profile as viewed from the vehicle left side, and the rear floor pan front section 12A and the rear floor pan rear section 12C are connected together by the rear floor pan intermediate section 12B.

Rear Side Members 14

The left and right rear side members 14 are frame members respectively disposed with their length directions along the vehicle front-rear direction on both vehicle width direction sides of the rear floor pan 12. Each rear side member 14 includes a rear side member front section 14A positioned between the left and right rear tires 28 as viewed from the vehicle vertical direction, and a rear side member rear section 14B extending from a rear end portion of the rear side member front section 14A toward the vehicle rear side. A front end portion of the rear side member front section 14A is joined (for example, welded, the same applies below) to a rear end portion of a rocker, not illustrated in the drawings.

the rear side member rear sections 14B are disposed at the vehicle upper side of both vehicle widths direction side portions of the rear floor pan rear section 12C. As is schematically illustrated in FIG. 5, a cross-section profile of each rear side member rear section 14B as viewed from the vehicle front-rear direction is formed in a hat shape open toward the vehicle lower side, and left and right flanges 34, 36 provided at the open side are joined by spot welding to an upper face of the rear floor pan rear section 12C.

The rear side member front sections 14A are disposed at the vehicle width direction outer sides of the rear floor pan front section 12A and the rear floor pan intermediate section 12B. Each rear side member front section 14A is formed with a hat-shaped cross-section open toward the vehicle width direction outer side as viewed from the vehicle front-rear direction, and a wall portion at the opposite side to the opening is joined by spot welding to respective vehicle width direction end portions of the rear floor pan front section 12A and the rear floor pan intermediate section 12B. Note that wheelhouses, not illustrated in the drawings, are joined to the respective vehicle width direction outer sides of the rear side member front sections 14A.

Lower Back 16

The lower back 16 (not illustrated other than in FIG. 4) is disposed extending along the vehicle width direction and the vehicle vertical direction at the vehicle rear side of the rear floor pan 12 and the left and right rear side members 14. The lower back 16 is joined to a rear end portion of the rear floor pan 12 by spot welding.

Rear Bumper Reinforcement 18

The rear bumper reinforcement 18 is disposed at the vehicle rear side of the lower back 16, at a similar height to the left and right rear side members 14. The rear bumper reinforcement 18 is a frame member linking respective rear end portions of the left and right rear side members 14 (the respective rear end portions of the left and right rear side member rear sections 14B) in the vehicle width direction, and is formed in an elongated shape with its length direction along the vehicle width direction. A cross-section profile of the rear bumper reinforcement 18 as viewed from the vehicle width direction is formed in a substantially B shape, and is fixed by bolt-fastening to the respective rear end portions of the left and right rear side members 14 in a state in which the lower back 16 is sandwiched between the respective rear end portions of the left and right rear side member rear sections 14B.

Rear Cross Member 20

The rear cross member 20 is a frame member linking respective front-rear direction intermediate portions of the left and right rear side members 14 in the vehicle width direction, and is formed in an elongated shape with its length direction along the vehicle width direction. The rear cross member 20 is configured by an above-floor cross member 38 disposed at the vehicle upper side of the rear floor pan intermediate section 12B, and an under-floor cross member 40 disposed at the vehicle lower side of the rear floor pan intermediate section 12B.

The above-floor cross member 38 includes an upper wall section 38A extending from a rear end portion of the rear floor pan front section 12A toward the vehicle rear side, and a rear wall section 38B extending from a rear end of the upper wall section 38A toward the vehicle lower side, and has a cross-section profile as viewed from the vehicle left side formed in an inverted, substantially L shape. A front end portion of the upper wall section 38A is overlapped with the rear end portion of the rear floor pan front section 12A and an upper end portion of the rear floor pan intermediate section 12B, and joined thereto by spot welding. A lower end portion of the rear wall section 38B is overlapped with a lower end portion of the rear floor pan intermediate section 12B and a front end portion of the rear floor pan rear section 12C, and joined thereto by spot welding. Thus, a closed cross-section (cavity) is formed extending along the vehicle width direction between the above-floor cross member 38 and the rear floor pan intermediate section 12B. Both vehicle width direction end portions of the above-floor cross member 38 are joined to the respective left and right rear side members 14.

A cross-section profile of the under-floor cross member 40 as viewed from the vehicle width direction forms a substantially straight line shape sloping downward toward the vehicle rear side, with an upper end portion (front end portion) joined to a lower face of the rear floor pan intermediate section 12B, and a lower end portion (rear end portion) joined to the rear floor pan rear section at the vehicle front side of the recessed section 30. Thus, a closed cross-section is formed extending along the vehicle width direction between the under-floor cross member 40 and the rear floor pan intermediate section 12B.

Rear Suspension Member 22

The rear suspension member 22 is disposed between the left and right rear tires 28. A suspension on which the left and right rear tires 28 are suspended, suspension arms, a stabilizer (none of which are illustrated in the drawings), and the like are attached to the rear suspension member 22. The rear suspension member 22 includes a left and right pair of side sections (side rail sections) 22A disposed with their length directions along the vehicle front-rear direction, and a rear cross member section 22B, serving as a cross member section linking rear portions of the left and right side sections 22A together in the vehicle width direction.

The left and right side sections 22A are disposed with their length directions along the vehicle front-rear direction at the vehicle lower side of the left and right rear side member front sections 14A, with respective rear end portions 22A1 and non-illustrated front end portions attached to the left and right rear side member front sections 14A by fastener members with non-illustrated mounting cushions interposed therebetween. A front-rear direction intermediate portion of each left and right side section 22A curves so as to bulge toward the vehicle width direction center side and vehicle upper side.

The left and right side sections 22A are each formed by a hollow pipe. The rear cross member section 22B is formed in an elongated shape with its length direction along the vehicle width direction, is disposed between the front-rear direction intermediate portions of the left and right side sections 22A, and has both vehicle width direction end portions joined to the left and right side sections 22A.

Reinforcement Members 24

The left and right reinforcement members 24 are disposed at the vehicle width direction inner side of the left and right rear side member rear sections 14B and at the vehicle rear side of the rear suspension member 22 (in this case, the vehicle rear side of the left and right side sections 22A). The reinforcement members 24 are each formed in an elongated shape with their length directions along the vehicle front-rear direction, are disposed close to the respective left and right rear side member rear sections 14B, and are disposed substantially parallel to the left and right rear side member rear sections 14B. Each reinforcement member 24 includes an above-floor reinforcement member 42 joined to the upper face of the rear floor pan rear section 12C, and an under-floor reinforcement member 44 joined to a lower face of the rear floor pan rear section 12C. The above-floor reinforcement member 42 and the under-floor reinforcement member 44 are each formed by pressing metal plate such as steel plate.

Each above-floor reinforcement member 42 is formed in an elongated shape with its length direction along the vehicle front-rear direction. As is schematically illustrated in FIGS. 5 and 6, a cross-section profile of the above-floor reinforcement member 42 as viewed from the vehicle front-rear direction is formed in a hat shape open toward the vehicle lower side. Specifically, the above-floor reinforcement member 42 includes an upper wall section 42A, an outer wall section 42B and an inner wall section 42C extending from both vehicle width direction end portions of the upper wall section 42A toward the vehicle lower side, an outer flange 42D extending from a lower end of the outer wall section 42B toward the vehicle width direction outer side, and an inner flange 42E extending from a lower end of the inner wall section 42C toward the vehicle width direction inner side. The upper wall section 42A projects out slightly further toward the vehicle rear side than the outer wall section 42B, the inner wall portion 42C, the outer flange 42D, and the inner flange 42E, and is disposed with a rear end abutting, or close to, the lower back 16. As illustrated in FIG. 6, a front portion of the inner wall section 42C enters into the recessed section 30 of the rear floor pan rear section 12C, and a vertical direction dimension of the front portion is larger than a vertical direction dimension of a rear portion thereof.

Each under-floor reinforcement member 44 is formed in an elongated shape with its length direction along the vehicle front-rear direction. As is schematically illustrated in FIGS. 5 and 6, a cross-section profile of the under-floor reinforcement member 44 as viewed from the vehicle front-rear direction is formed in a hat shape open toward the vehicle upper side. Specifically, the under-floor reinforcement member 44 includes a lower wall section 44A, an outer wall section 44B and an inner wall section 44C extending from both vehicle width direction end portions of the lower wall section 44A toward the vehicle upper side, an outer flange 44D extending from an upper end of the outer wall section 44B toward the vehicle width direction outer side, and an inner flange 44E extending from an upper end of the inner wall section 44C toward the vehicle width direction inner side.

The above-floor reinforcement member 42 and the under-floor reinforcement member 44 are set with substantially the same lengths in the vehicle front-rear direction, and are disposed so as to overlap each other as viewed from the vehicle vertical direction. The outer flange 42D of the above-floor reinforcement member 42 and the outer flange 44D of the under-floor reinforcement member 44 are joined by spot welding in a three layer overlapping state in which the rear floor pan rear section 12C is sandwiched therebetween. The inner flange 42E of the above-floor reinforcement member 42 and the inner flange 44E of the under-floor reinforcement member 44 are also joined by spot welding in a three layer overlapping state in which the rear floor pan rear section 12C is sandwiched therebetween. A closed cross-section extending along the vehicle front-rear direction is thereby formed by the above-floor reinforcement member 42 and the under-floor reinforcement member 44, and closed cross-sections that respectively extend along the vehicle front-rear direction are also formed between the above-floor reinforcement member 42 and the rear floor pan rear section 12C, and between the under-floor reinforcement member 44 and the rear floor pan rear section 12C.

A left and right pair of ridgeline sections 46, 48 are formed extending in straight line shapes along the vehicle front-rear direction at an upper end portion of each above-floor reinforcement member 42. The ridgeline section 46 at the vehicle width direction outer side is a bent section formed at a boundary between the upper wall section 42A and the outer wall section 42B. The ridgeline section 48 at the vehicle width direction inner side is a bent section formed at a boundary between the upper wall section 42A and the inner wall portion 42C. The ridgeline sections (bent sections) 46, 48 bend at right angles or at substantially right angles as viewed from the vehicle front-rear direction, and extend along the vehicle front-rear direction. As illustrated in the enlarged region surrounded by a single-dotted dashed line in FIG. 5, a bend radius R is set at the ridgeline section 48. Namely, the ridgeline section 48 bends in a circular arc shape when viewed enlarged from the vehicle front-rear direction. This similarly applies to the ridgeline section 46, and to ridgeline sections 50, 52, 54, and 56, described later. In the present exemplary embodiment, "ridgeline section extending in a straight line shape along the vehicle front-rear direction" is synonymous with "bent section that bends as viewed from the vehicle front-rear direction and extends in a straight line shape along the vehicle front-rear direction".

The left and right ridgeline sections 46, 48 are formed across substantially the entire region of the length direction of each above-floor reinforcement member 42 (the region in the vehicle front-rear direction in which the outer wall section 42B and the inner wall section 42C are provided). Namely, the left and right ridgeline sections 46, 48 are each formed continuously and without interruption from a front end portion to a rear end portion of each above-floor reinforcement member 42. Forming the ridgeline sections 46, 48 improve the rigidity of the above-floor reinforcement member 42 against load in the vehicle front-rear direction, such that the above-floor reinforcement member 42 is less liable to buckle under load in the vehicle front-rear direction.

Similarly, the left and right pair of ridgeline sections 50, 52 are formed extending in straight line shapes along the vehicle front-rear direction at a lower end portion of each under-floor reinforcement member 44. The ridgeline section 50 at the vehicle width direction outer side is a bent section formed at a boundary between the lower wall section 44A and the outer wall section 44B. The ridgeline section 52 at the vehicle width direction inner side is a bent section formed at a boundary between the lower wall section 44A and the inner wall section 44C. The ridgeline sections (bent sections) 50, 52 bend at right angles or at substantially right angles as viewed from the vehicle front-rear direction, and extend along the vehicle front-rear direction. The ridgeline sections 50, 52 are formed across the entire region of the length direction of each under-floor reinforcement member 44. Namely, the left and right ridgeline sections 50, 52 are each formed continuously and without interruption from a front end portion to a rear end portion of each under-floor reinforcement member 44. Forming the ridgeline sections 50, 52 improves the rigidity of the under-floor reinforcement member 44 against load in the vehicle front-rear direction.

As is schematically illustrated in FIG. 5, at least part of a rear end portion of each left and right reinforcement member 24 (a rear end portion of each above-floor reinforcement member 42 in this case), configured as described above, overlaps the rear bumper reinforcement 18 in vehicle front-rear direction view. Moreover, at least part of a front end portion of each left and right reinforcement member 24 overlaps the respective left or right side section 22A of the rear suspension member 22 in vehicle front-rear direction view. Specifically, at least part of each of the front end portions of the left and right reinforcement members 24 overlap the respective left and right side sections 22A in vehicle front-rear direction view. The rear cross member 20 is interposed between the front end portions of the left and right reinforcement members 24 and the left and right side sections 22A of the rear suspension member 22.

As illustrated in FIG. 4, the above-floor reinforcement member 42 and the under-floor reinforcement member 44 of each left and right reinforcement member 24, configured as described above, are disposed such that the positions of respective front ends in the vehicle front-rear direction match each other. The front ends of the above-floor reinforcement members 42 are positioned separated from and at the vehicle rear side of the rear cross member 20, such that a gap (space) is formed between the front ends of the above-floor reinforcement members 42 and the rear cross member 20.

Front Brackets 26

The left and right front brackets 26 are each formed by pressing metal plate such as steel plate, for example, and each have a cross-section profile as viewed from the vehicle front-rear direction formed in a substantially hat shape open toward the vehicle lower side. Specifically, as is schematically illustrated in FIG. 6, each left and right front bracket 26 includes an upper wall section 26A, and an outer wall section 26B and an inner wall section 26C extending from both vehicle width direction ends of the upper wall section 26A toward the vehicle lower side. A lower end portion of the outer wall section 26B bends toward the vehicle width direction outer side, and a lower end portion of the inner wall section 26C bends toward the vehicle width direction inner side. The inner wall section 26C is set with a longer dimension in the vehicle vertical direction than the outer wall section 26B.

The front end portions of the left and right above-floor reinforcement members 42 are fitted inside rear portions of the left and right front brackets 26. Specifically, each upper wall section 26A is overlapped with the respective upper wall section 42A from the vehicle upper side, the outer wall section 26B is overlapped with the outer wall section 42B from the vehicle width direction outer side, and the inner wall section 26C is overlapped with the inner wall section 42C from the vehicle width direction inner side. The upper wall section 26A and the upper wall section 42A are fastened and fixed together using a front and rear pair of bolts 31 and nuts 33 (see FIGS. 1, 2, and 4). The inner wall section 26C and the inner wall section 42C are fastened and fixed together by a front and rear pair of bolts 35 and nuts 37 (see FIGS. 1, 2, and 4). Thus, the left and right front brackets 26 are fixed to the front end portions of the left and right reinforcement members 24.

A front flange 26F is formed extending toward the vehicle upper side from a front end of each upper wall section 26A. The front flange 26F is overlapped with the rear wall section 38B of the above-floor cross member 38 of the rear cross member 20 from the vehicle rear side, and is fastened and fixed to the rear wall section 38B by a bolt 39 and a nut 41 (see FIG. 4). Thus, front end portions of the left and right front brackets 26 are fixed to the rear cross member 20, and the rear cross member 20 and the left and right reinforcement members 24 are coupled together by the front brackets 26.

The left and right pair of ridgeline sections 54, 56 are each formed extending in straight line shapes along the vehicle front-rear direction on each left and right front bracket 26. The ridgeline section 54 at the vehicle width direction outer side is a bent section formed at a boundary between the upper wall section 26A and the outer wall section 26B. The ridgeline section 56 at the vehicle width direction inner side is a bent section formed at a boundary between the upper wall section 26A and the inner wall section 26C. The ridgeline sections (bent sections) 54, 56 bend at right angles or at substantially right angles as viewed from the vehicle front-rear direction, and extend along the vehicle front-rear direction. The ridgeline sections 54, 56 are formed across the entire region of the length direction of each left and right front bracket 26. Namely, the left and right ridgeline sections 54, 56 are each formed continuously and without interruption from the front end portion to a rear end portion of each front bracket 26. Forming the ridgeline sections 54, 56 improves the rigidity of the front bracket 26 against load in the vehicle front-rear direction.

Operation and Effects

Explanation follows regarding operation and effects of the first exemplary embodiment.

In the vehicle rear section structure 10 with the above configuration, when a rear-end collision occurs, rear collision load is input to the left and right rear side members 14, and the left and right reinforcement members 24 disposed at the vehicle width direction inner side of the left and right rear side members 14. The left and right reinforcement members 24 are disposed with their length directions along the vehicle front-rear direction at the vehicle rear side of the rear suspension member 22, with at least part of each of the respective front end portions overlapping the left and right side sections 22A of the rear suspension member 22 in vehicle front-rear direction view. Thus, the left and right reinforcement members 24 engage with (abut with the rear cross member 20 interposed therebetween in this case) the left and right side sections 22A of the rear suspension member 22 from the vehicle rear side, such that rear collision load is transmitted to the vehicle front side through the left and right reinforcement members 24 and the rear suspension member 22 (see the arrow A in FIGS. 7 and 8). Since the reinforcement members 24 include the ridgeline sections 46, 48, 50, and 52 extending in straight line shapes along the vehicle front-rear direction, rigidity against rear collision load is increased, thereby enabling rear collision load to be efficiently transmitted toward the vehicle front side. The deformation amount (deformation stroke) of the vehicle rear section is reduced accordingly.

The rear suspension member 22 is utilized to transmit rear collision load toward the vehicle front side, thereby enabling the load input to the entire vehicle body to be increased without improving the yield strength of the left and right rear side members 14. Namely, if the rear suspension member 22 is not utilized to transmit rear collision load toward the vehicle front side, rear collision load would be transmitted from the left and right rear side member rear sections 14B to the left and right rear side member front sections 14A, and rear collision load input to the left and right reinforcement members 24 would also be transmitted to the left and right rear side member front sections 14A through the rear cross member 20. Thus, a need would arise to reinforce the left and right rear side member front sections 14A in order to improve the yield strength of the left and right rear side member front sections 14A. The mass of the vehicle would increase accordingly; however, the present exemplary embodiment enables this to be avoided.

In the present exemplary embodiment, the respective rear end portions of the left and right rear side members 14 are coupled together in the vehicle width direction by the rear bumper reinforcement 18, and at least part of each of the respective rear end portions of the left and right reinforcement members 24 overlap the rear bumper reinforcement 18 in the vehicle front-rear direction view. Thus, rear collision load input to the rear bumper reinforcement 18 is distributed and input to the left and right rear side members 14 and to the left and right reinforcement members 24. This enables the number of transmission paths of rear collision load input to the rear bumper reinforcement 18 toward the vehicle front side to be increased. This enables rear collision load to be transmitted to the left and right reinforcement members 24 at an earlier stage than in cases in which no part of the respective rear end portions of the left and right reinforcement members 24 overlap with the rear bumper reinforcement 18 in vehicle front-rear direction view.

The present exemplary embodiment includes the rear cross member 20 that links the respective front-rear direction intermediate portions of the left and right rear side members 14 together in the vehicle width direction, and the rear cross member 20 is interposed between the left and right reinforcement members 24 and the left and right side sections 22A of the rear suspension member 22. Thus, rear collision load input to the left and right reinforcement members 24 is transmitted to the left and right side sections 22A of the rear suspension member 22 through the rear cross member 20. This enables rear collision load to be transmitted to the left and right side sections 22A at an earlier stage than in cases in which the rear cross member 20 is not interposed between the left and right reinforcement members 24 and the left and right side sections 22A.

In the present exemplary embodiment, the left acid right reinforcement members 24 each include the above-floor reinforcement member 42 joined to the upper face of the rear floor pan rear section 12C, and the under-floor reinforcement member 44 joined to the lower face of the rear floor pan rear section 12C. This enables the ridgeline sections 46, 48, 50, and 52, which respectively extend in straight line shapes along the vehicle front-rear direction irrespective of the shape of the rear floor pan 12, to be set at locations at the opposite side of the above-floor reinforcement member 42 and the under-floor reinforcement member 44 to the rear floor pan 12 (locations at the upper end portion of the above-floor reinforcement member 42 and the lower end portion of the under-floor reinforcement member 44). This enables the number of ridgeline sections formed in straight line shapes to the left and right reinforcement members 24 to be increased compared to cases in which the left and right reinforcement members 24 are only joined to the upper face of the rear floor pan 12, or only joined to the lower face of the rear floor pan 12.

The present exemplary embodiment includes the left and right front brackets 26 that couple the respective front end portions of the left and right reinforcement members 24 and the rear cross member 20 together. Thus, rear collision load input to the left and right reinforcement members 24 is transmitted to the rear cross member 20 through the left and right front brackets. This enables load to be transmitted to the rear cross member 20 at an earlier stage. Moreover, the left and right front brackets 26 are formed with the ridgeline sections 54, 56 extending in straight line shapes along the vehicle front-rear direction, such that rigidity against rear collision load is increased, thereby enabling rear collision load to be efficiently transmitted toward the vehicle front side. This makes the assembly operation of the left and right reinforcement members 24 to the vehicle rear section easier than in cases in which the respective front end portions of the left and right reinforcement members 24 are directly joined to the rear cross member 20, for example.

Various Modified Examples of First Exemplary Embodiment

Explanation follows regarding various modified examples of the first exemplary embodiment. Note that configuration and operation that is basically the same as those in the first exemplary embodiment are appended with the same reference numerals as in the first exemplary embodiment, and explanation thereof is omitted. Although not illustrated in the drawings, in each of the various modified examples described below, at least part of each of the front end portions of the reinforcement members 24 are disposed so as to overlap the rear suspension member 22 in vehicle front-rear direction view.

First Modified Example

FIG. 9 is a cross-section corresponding to FIG. 5, schematically illustrating configuration surrounding a reinforcement member 24 according to a first modified example of the first exemplary embodiment. In the first modified example, the under-floor reinforcement member 44 is omitted, and the reinforcement member 24 is configured by the above-floor reinforcement member 42 alone. The first modified example enables configuration to be simpler than in the first exemplary embodiment.

Second Modified Example

FIG. 10 is a cross-section corresponding to FIG. 5, schematically illustrating configuration surrounding a reinforcement member 24 according to a second modified example of the first exemplary embodiment. In the second modified example, the above-floor reinforcement member 42 is omitted, and the reinforcement member 24 is configured by the under-floor reinforcement member 44 alone. The second modified example also enables configuration to be simpler than in the first exemplary embodiment. The second modified example enables to secure a wide luggage space, formed above the rear floor pan rear section 12C.

Third Modified Example

FIG. 11 is a cross-section viewed from the vehicle left side, illustrating configuration surrounding a reinforcement member 24 according to a third modified example of the first exemplary embodiment. In the third modified example, the position of the rear end portion of the above-floor reinforcement member 42 is separated from and is at the vehicle front side of the lower back 16, and the rear end portion of the above-floor reinforcement member 42 and the lower back 16 are coupled together by a rear bracket 58. Similarly to the front brackets 26, the rear bracket 58 includes an upper wall section 58A, an non-illustrated outer wall section extending from a vehicle width direction outer side end portion of the upper wall section 58A toward the vehicle lower side, and an inner wall section 58B extending from a vehicle width direction inner side end portion of the upper wall section 58A toward the vehicle lower side. The rear end portion of the above-floor reinforcement member 42 is fitted inner side the rear bracket 58. The rear bracket 58 is fastened and fixed to the above-floor reinforcement member 42 using plural bolts 59 and nuts, not illustrated in the drawings. The rear bracket 58 also includes a rear flange 58C extending from a rear end portion of the upper wall section 58A toward the vehicle upper side. The rear flange 58C is fastened and fixed to the lower back 16 using a nut 61 and a bolt 63. Note that, although not explained in detail, a left and right pair of ridgeline sections are formed in straight line shapes along the vehicle front-rear direction from a front end portion across to a rear end portion on an upper end portion of the rear bracket 58.

In the third modified example, rear collision load input to the lower back 16 is input to the left and right above-floor reinforcement members 42 through the left and right rear brackets 58. This enables rear collision load to be transmitted to the left and right above-floor reinforcement members 42, namely, the left and right reinforcement members 24, at an earlier stage. Moreover, the left and right front brackets 26 have increased rigidity against rear collision load due to the left and right pair of ridgeline sections extending in straight line shapes along the vehicle front-rear direction being formed thereto, thereby enabling the rear collision load to be efficiently transmitted toward the vehicle front side. Moreover, the assembly operation of the left and right reinforcement members 24 to the vehicle rear section is easier than in cases in which the respective rear end portions of the left and right reinforcement members 24 are directly joined to the lower back 16, for example.

Fourth Modified Example

FIG. 12 is a cross-section viewed from the vehicle left side, illustrating configuration surrounding a reinforcement member 24 according to a fourth modified example of the first exemplary embodiment. The fourth modified example includes the rear brackets 58 similarly to the rear brackets 58 according to the third modified example; however, the front brackets 26 according to the first exemplary embodiment are omitted. The front end portions of the above-floor reinforcement members 42 are directly joined to a back face (the rear wall section 38B of the above-floor cross member 38) of the rear cross member 20. Since the front brackets 26 are omitted in the fourth modified example, the configuration is simplified. Note that the front end portions of the above-floor reinforcement members 42 may be configured abutting, or disposed close to, the back face of the rear cross member 20.

Fifth Modified Example

FIG. 13 is a cross-section viewed from the vehicle left side, illustrating configuration surrounding a reinforcement member 24 according to a fifth modified example of the first exemplary embodiment. In the fifth modified example, the front brackets 26 according to the first exemplary embodiment are omitted. Further, in the fifth modified example, the front end portions of the above-floor reinforcement members 42 are directly joined to the back face (the rear wall section 38B of the above-floor cross member 38) of the rear cross member 20. The respective rear end portions of the above-floor reinforcement members 42 and the under-floor reinforcement members 44 are directly joined to the lower back 16. The fifth modified example enables configuration to be even simpler than in the fourth modified example. Note that configuration may be such that the front end portions of the above-floor reinforcement members 42 abut, or are disposed close to, the back face of the rear cross member 20, and the respective rear end portions of the above-floor reinforcement members 42 and the under-floor reinforcement members 44 abut, or are disposed close to, the lower back 16.

Second Exemplary Embodiment

Explanation follows regarding a vehicle rear section structure 70 according to a second exemplary embodiment of the present disclosure, with reference to FIGS. 14 to 27B. Note that configuration and operation that are basically the same as those in the first exemplary embodiment are appended with the same reference numerals as in the first exemplary embodiment, and explanation thereof is omitted.

As illustrated in FIGS. 14 to 17, similarly to the vehicle rear section structure 10 according to the first exemplary embodiment, the vehicle rear section structure 70 according to the second exemplary embodiment includes the rear floor pan 12, the left and right pair of rear side members 14, the lower back 16, the rear bumper reinforcement 18, the rear cross member 20, the rear suspension member 22, and a left and right pair of reinforcement members 72. The vehicle rear section structure 70 also includes a left and right pair of front coupling brackets 74, and a left and right pair of rear coupling brackets 76. The left and right front coupling brackets 74 and the left and right rear coupling brackets 76 each correspond to "left and right coupling sections" according to the present disclosure.

Note that the rear floor pan 12, the left and right rear side members 14, the lower back 16, the rear bumper reinforcement 18, and the rear suspension member 22 have basically the same configuration as those in the first exemplary embodiment, except that their shape, dimension, or the like differs slightly, and so the respective drawings are appended with the same reference numerals as in the first exemplary embodiment. Detailed explanation mainly follows regarding points of difference to the first exemplary embodiment.

The present exemplary embodiment is configured such that the rear cross member 20 does not include the under-floor cross member 40 according to the first exemplary embodiment. The present exemplary embodiment is also configured such that the front brackets 26 according to the first exemplary embodiment is omitted. In the present exemplary embodiment, the left and right reinforcement members 72 are configured differently from the left and right reinforcement members 24 according to the first exemplary embodiment. The left and right side sections 22A of the rear suspension member 22 respectively include a left and right pair of load bearing sections 78 (see FIG. 17, not illustrated in FIGS. 14 to 16). Left and right bulk members 82 (see FIG. 17, not illustrated in FIGS. 14 to 16) are installed inner side the closed cross-section of the rear cross member 20. The present exemplary embodiment also includes a left and right pair of fasteners 80 (see FIG. 17, not illustrated in FIGS. 14 to 16) that directly fasten and fix the rear bumper reinforcement 18 and the lower back 16 together. The left and right fasteners 80 correspond to "left and right projection sections" according to the present disclosure. Explanation follows regarding these configuration elements.

Left and Right Reinforcement Members 72

The left and right reinforcement members 72 are disposed at the vehicle width direction inner side of the left and right rear side member rear sections 14B, and at the vehicle rear side of the rear suspension member 22. The reinforcement members 24 are each formed in an elongated shape with its length direction along the vehicle front-rear direction, are disposed close to the respective left and right rear side member rear sections 14B, and are disposed substantially parallel to the left and right rear side member rear sections 14B. Note that in the present exemplary embodiment, the left and right reinforcement members 72 slope slightly with respect to the vehicle front-rear direction, such that front end portions are positioned slightly further toward the vehicle width direction inner side than rear end portions thereof. Each reinforcement member 72 is configured by a reinforcement member main body 84, a front plate 86, and a rear plate 88.

The reinforcement member main body 84 is formed by extrusion forming a metal material, for example, and is formed in an elongated shape with its length direction along the vehicle front-rear direction. As illustrated in FIG. 23, when viewed from the vehicle front-rear direction, the reinforcement member main body 84 is formed in a shape in which ribs with a cross-shaped cross-section are provided inner side a tubular body with a substantially hexagonal shaped cross-section.

Specifically, the reinforcement member main body 84 includes an upper wall section 84A and a lower wall section 84B, an outer wall section 84C that links vehicle width direction outer side end portions of the upper wall section 84A and the lower wall section 84B in the vehicle vertical direction, and an inner wall section 84I that links vehicle width direction inner side end portions of the upper wall section 84A and the lower wall section 84B in the vehicle vertical direction. The outer wall section 84C bends toward the vehicle width direction inner side at an vertical direction intermediate portion, and a lower portion side slopes toward the vehicle width direction inner side and vehicle lower side. The inner wall section 84D bends toward the vehicle width direction outer side at a vertical direction intermediate portion, and a lower portion side slopes toward the vehicle width direction outer side and vehicle lower side. A closed cross-section extending along the vehicle front-rear direction is formed by the upper wall section 84A, the lower wall section 84B, the outer wall section 84C, and the inner wall section 84D. Namely, the closed cross-section of the reinforcement member main body 84 is formed as a single body extending along the vehicle front-rear direction.

The reinforcement member main body 84 also includes a vertical rib 84E and a lateral rib 84F installed inner side the closed cross-section. The vertical rib 84E links vehicle width direction center portions of the upper wall section 84A and the lower wall section 84B in the vehicle vertical direction, and the lateral rib 84F links vehicle vertical direction center portions of the outer wall section 84C and the inner wall section 84D in the vehicle width direction. A vehicle vertical direction center portion of the vertical rib 84E and a vehicle width direction center portion of the lateral rib 84F form an integral unit where the vertical rib 84E and the lateral rib 84F intersect each other.

A left and right pair of ridgeline sections 90, 92 are formed extending in straight line shapes along the vehicle front-rear direction at an upper end portion of the reinforcement member main body 84. The ridgeline section 90 at the vehicle width direction outer side is a bent section formed at a boundary between the upper wall section 84A and the outer wall section 84C. The ridgeline section 92 at the vehicle width direction inner side is a bent section formed at a boundary between the upper wall section 84A and the inner wall section 841). The ridgeline sections (bent sections) 90, 92 bend at right angles or at substantially right angles as viewed from the vehicle front-rear direction, and extend along the vehicle front-rear direction.

A left and right pair of ridgeline sections 94, 96 are formed extending in straight line shapes along the vehicle front-rear direction at a lower end portion of the reinforcement member main body 84. The ridgeline section 94 at the vehicle width direction outer side is a bent section formed at a boundary between the lower wall section 84B and the outer wall section 84C. The ridgeline section 96 at the vehicle width direction inner side is a bent section formed at a boundary between the lower wall section 84B and the inner wall section 84D. The ridgeline sections (bent sections) 94, 96 bend in obtuse angles as viewed from the vehicle front-rear direction, and extend along the vehicle front-rear direction.

A left and right pair of ridgeline sections 98, 100 are also formed extending in straight line shapes along the vehicle front-rear direction at a vertical direction intermediate portion of the reinforcement member main body 84. The ridgeline section 98 at the vehicle width direction outer side is a bent section formed at a vertical direction intermediate portion of the outer wall section 84C. The ridgeline section 100 at the vehicle width direction inner side is a bent section formed at a vertical direction intermediate portion of the inner wall section 84D. The ridgeline sections (bent sections) 98, 100 bend in obtuse angles as viewed from the vehicle front-rear direction, and extend along the vehicle front-rear direction. The ridgeline sections 90, 92, 94, 96, 98, and 100 are each formed continuously and without interruption from the front end portion across to the rear end portion of each reinforcement member 72. The left and right reinforcement member main bodies 84 have improved rigidity under load in the vehicle front-rear direction due to forming the ridgeline sections 90, 92, 94, 96, 98, and 100. Note that the ridgeline sections 90, 92, 94, 96, 98, and 100 each bend in a circular arc shape when viewed enlarged from the vehicle front-rear direction.

Figure 17:
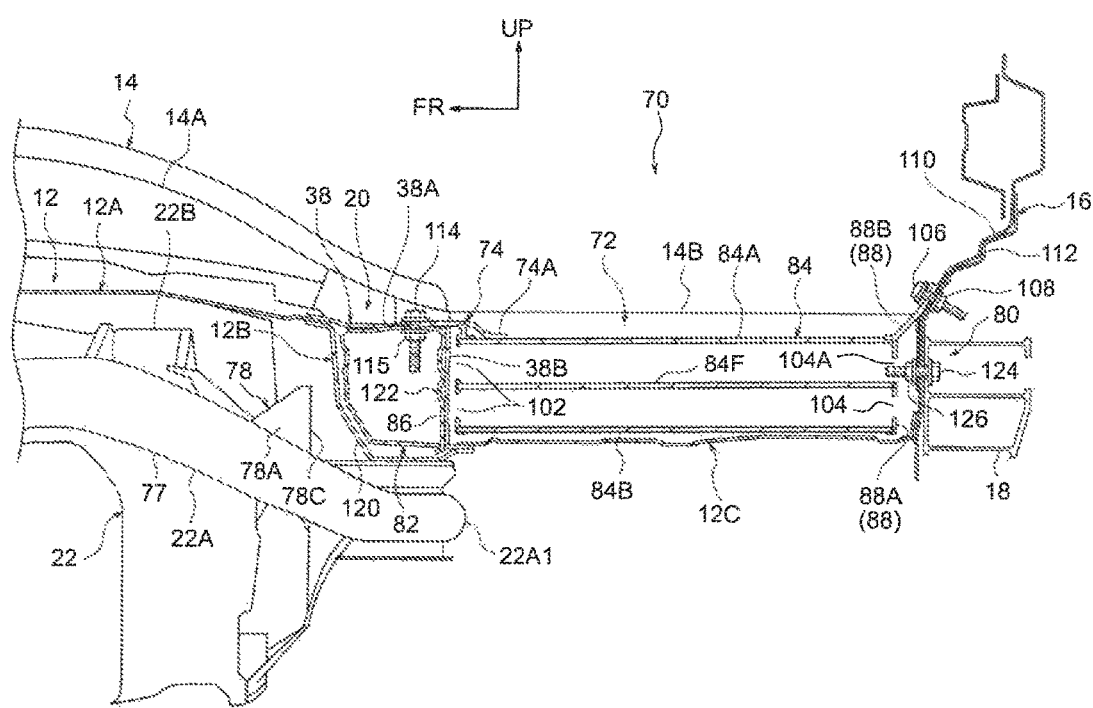
FIG. 17 is an enlarged cross-section sectioned along line F17-F17 in FIG. 15.

As illustrated in FIGS. 17 and 23, the front plate 86 is formed of metal in a plate shape, and is disposed at the vehicle front side of the reinforcement member main body 84 in a state with its plate thickness direction along the vehicle front-rear direction. The front plate 86 is joined to a front end portion of the reinforcement member main body 84 by welding or the like. The rear plate 88 is similarly formed of metal in a plate shape, and includes a plate main body 88A disposed at the vehicle rear side of the reinforcement member main body 84 in a state with its plate thickness direction along the vehicle front-rear direction. The plate main body 88A is joined to a rear end portion of the reinforcement member main body 84 by welding or the like. Plural through-holes 102, 104 are respectively formed in the front plate 86 and the plate main body 88A. One (the through-hole appended with the reference numeral 104A in FIGS. 17, 20, and 23) of the plural through-holes 104 formed to the plate main body 88A corresponds to a "hole section" according to the present disclosure, and is aligned with the fastener 80, described later.

The rear plate 88 also includes a coupling tab 88B that extends sloping from an upper end of the plate main body 88A toward the vehicle upper side and vehicle rear side. The coupling tab 88B is fastened and fixed to the lower back 16 using a left and right pair of bolts 106 (see FIGS. 14 to 17, not illustrated in FIG. 20), and a left and right pair of nuts 108 (see FIGS. 17 and 22, not illustrated in FIGS. 14 to 16). The rear end portions of the reinforcement members 72 are thereby coupled to, and supported by, the lower back 16. While the lower back 16 is schematically illustrated in FIG. 4 in the first exemplary embodiment, as illustrated in FIG. 17, the lower back 16 includes a lower back panel 110, and lower back reinforcement 112 overlapped with the vehicle rear side of the lower back panel 110. The bolts 106 pierce through both the lower back panel 110 and the lower back reinforcement 112.

Configuration of Front Coupling Brackets 74

As illustrated in FIGS. 14, 15, and 16, the left and right front coupling brackets 74 are each formed by pressing metal plate, for example, and are formed in elongated plate shapes. The left and right front coupling brackets 74 are disposed at the vehicle upper side of the front end portions of the respective left and right reinforcement members 72, in a state with their length directions sloping with respect to the vehicle front-rear direction. Specifically, each left and right front coupling bracket 74 slopes such that a front end portion, this being one length direction end portion, is positioned further toward the vehicle width direction inner side than a rear end portion, this being another length direction end portion.

A location at the vehicle width direction inner side of each left and right front coupling bracket 74 bends in a crank shape toward the vehicle lower side. A flange shaped engagement section 74A is thereby formed at a vehicle width direction inner side end portion of each front coupling bracket 74. The engagement section 74A is overlapped with an upper face of the upper wall section 84A of the respective reinforcement member main body 84, and joined to the upper wall section 84A by welding or the like. Note that a location at the vehicle width direction inner side of the front coupling bracket 74 may be configured fixed to the upper wall section 84A by bolt-fastening.

As illustrated in FIGS. 14, 15, and 16, the front end portion of each left and right front coupling bracket 74 is overlapped with an upper face of the upper wall section 38A of the rear cross member 20, and fastened and fixed to the upper wall section 38A by a bolt 114 and a nut 115. The front end portions of the left and right reinforcement members 72 are thereby coupled to, and supported by, the rear cross member 20. Namely, in the present exemplary embodiment, the left and right reinforcement members 72 have their front end portions supported by the rear cross member 20, and their rear end portions supported by the lower back 16. Thus, the left and right reinforcement members 72 are disposed slightly separated from and at the vehicle upper side of the rear floor pan rear section 12C. Namely, the present exemplary embodiment is configured such that the left and right reinforcement members 72 are not joined to the rear floor pan rear section 12C.

The rear end portion of each left and right front coupling bracket 74 is overlapped with an upper face of the rear side member rear section 14B that is adjacent at the vehicle width direction outer side, and is fastened and fixed to the rear side member rear section 14B by a bolt 116 and a nut, not illustrated in the drawings. Thus, the front end portions of the reinforcement members 72 are respectively coupled to the rear side member rear sections 14B positioned at the vehicle width direction outer sides of the reinforcement members 72.

As illustrated in FIGS. 14 and 15, the left and right rear coupling brackets 76 (not illustrated in FIG. 17) are each formed by pressing metal plate, for example, and are each formed in a substantially L shape in plan view. A location at the vehicle width direction inner side of each rear coupling bracket 76 projects out further toward the vehicle front side than a location at the vehicle width direction outer side thereof. The rear coupling brackets 76 are disposed at the vehicle upper side of the left and right reinforcement members 72 and the left and right rear side member rear sections 14B, and respectively span across between the rear end portions of the left and right reinforcement members 72 and the left and right rear side member rear sections 14B.

A location at the vehicle width direction inner side of each left and right rear coupling bracket 76 bends in a crank shape toward the vehicle lower side. A flange shaped joint section 76A is thereby formed at a vehicle width direction inner side end portion of each rear coupling bracket 76. The joint section 76A is overlapped with the upper face of the upper wall section 84A of the reinforcement member main body 84 and joined to the upper wall section 84A by welding or the like. Note that the location at the vehicle width direction inner side of each rear coupling bracket 76 may be configured fixed to the upper wall section 84A by bolt-fastening.

An end portion at the vehicle width direction outer side of each left and right rear coupling bracket 76 is overlapped with the upper face of the rear side member rear section 14B that is adjacent at the vehicle width direction outer side thereof, and is fastened and fixed to the rear side member rear section 14B by a bolt 118 and a nut, not illustrated in the drawings. Thus, the rear end portion of each reinforcement member 72 is coupled to the respective rear side member rear section 14B positioned at the vehicle width direction outer side of the reinforcement member 72.

Left and Right Load Bearing Sections 78

The left and right load bearing sections 78 are installed at the rear portion side of the left and right side sections 22A of the rear suspension member 22, and project out toward the vehicle upper side from left and right side section main bodies 77, these being the respective main bodies of the left and right side sections 22A. The left and right side section main bodies 77 are disposed with their length directions along the vehicle front-rear direction, with the rear end portions 22A1 and non-illustrated front end portions attached to the respective left and right rear side member front sections 14A. The left and right load bearing sections 78 respectively configure part of the left and right side sections 22A. The load bearing sections 78 are formed of metal, are each formed in a rectangular shape as viewed from the vehicle front-rear direction, and are each formed in a substantially triangular shape as viewed from the vehicle width direction.

As illustrated in FIG. 18A, each load bearing section 78 includes a left and right pair of side wall sections 78A, 78B, a rear wall section 78C that links rear end portions of the left and right side wall sections 78A, 78B in the vehicle width direction and extends along the vehicle vertical direction, a front wall section 78D extending from an upper end of the rear wall section 78C diagonally toward the vehicle lower front side, and an inner side wall section 78E that is disposed between the rear wall section 78C and the front wall section 78D and extends diagonally toward the vehicle lower front side.

The left and right side wall sections 78A, 78B, the rear wall section 78C, and the front wall section 78D are formed as an integral unit by bending a single metal plate. The inside wall section 78E, formed of metal plate and formed as a separate member to the rear wall section 78C, the front wall section 78D, and the left and right side wall sections 78A, 78B, is joined to the left and right side wall sections 78A, 78B by welding. Respective lower end portions of the rear wall section 78C, the front wall section 78D, and the left and right side wall sections 78A, 78B are joined by welding to an upper face of the respective side section main body 77.

As is schematically illustrated in FIG. 18B, in vehicle front-rear direction view upper portions sides of the left and right load bearing sections 78 configured as described above overlap lower portion sides of the respective front end portions of the left and right reinforcement members 72. Namely, in the present exemplary embodiment, at least part of each of the left and right reinforcement members 72 overlaps the left and right load bearing sections 78 in vehicle front-rear direction view.

Left and Right Bulk Members 82

As illustrated in FIGS. 17, 19A, and 19B, each left and right bulk member 82 is configured in a box shape by joining together a substantially box shaped bulk main body 120 open toward the vehicle upper side and vehicle rear side, and a lid member 122 bent in an inverted, substantially L shape as viewed from the vehicle left side. The bulk main body 120 and the lid member 122 are each formed of metal plate, for example. The bulk main body 120 includes a left and right pair of side wall sections 120A, 120B, a lower wall section 120C linking lower end portions of the left and right side wall sections 120A, 120B together in the vehicle width direction, and a front wall section 120D linking front end portions of the left and right side wall sections 120A, 120B together in the vehicle width direction. The bulk main body 120 also includes left and right rear flanges 120E (not illustrated in FIG. 19A) extending from rear end portions of the left and right side wall sections 120A, 120B toward opposite sides to each other, and left and right upper flanges 120F (not illustrated in FIG. 19A) extending from upper end portions of the left and right side wall sections 120A, 120B toward opposite sides to each other.

The lid member 122 includes an upper wall section 122A, and a rear wall section. 122B extending from a rear end of the upper wall section 122A toward the vehicle lower side. Both vehicle width direction end portions of the upper wall section 122A are overlapped with the left and right upper flanges 120F of the bulk main body 120 from the vehicle upper side, and are joined to the left and right upper flanges 120E by spot welding. Both vehicle width direction end portions of the rear wall section 122B are overlapped with the left and right rear flanges 120E of the bulk main body 120 from the vehicle rear side, and are joined to the left and right rear flanges 120E by spot welding.

The left and right bulk members 82 configured as described above are provided inside the closed cross-section of the rear cross member 20 at both vehicle width direction end sides of the rear cross member 20, and are fixed to the rear cross member 20 by welding, bolt-fastening, or the like. The left and right bulk members 82 are interposed between the respective front end portions of the left and right reinforcement members 72 and the left and right load bearing sections 78 of the rear suspension member 22.

Left and Right Fasteners 80

As illustrated in FIG. 17 and FIGS. 20 to 22, in the present exemplary embodiment, the rear bumper reinforcement 18 and the lower back 16 are fastened and fixed together by bolts 124 and nuts 126, serving as the left and right fasteners 80, further toward the vehicle width direction inner side than the left and right rear side member rear sections 14B. The bolts 124 are pierced through the rear bumper reinforcement 18 and the lower back 16 from the vehicle rear side, and the nuts 126 are fitted together with the bolts 124 from the vehicle inner side, that is, vehicle front side.

The bolts 124 and the nuts 126 are respectively provided at the vehicle rear of the left and right reinforcement members 72. Specifically, in vehicle front-rear direction view, the left and right bolts 124 and nuts 126 are disposed in positions overlapping the through-holes 104A formed in the plate main bodies 88A of the rear plates 88 as previously described. A leading end side of each bolt 124 is inserted through the respective through-hole 104A. Note that members appended with the reference numerals 128, 130 in FIGS. 20 to 22 are bolts and nuts that fasten and fix rear end portions of the rear side member rear sections 14B and the rear bumper reinforcement 18 together.

The present exemplary embodiment is configured such that the leading end side of each bolt 124 is ordinarily inserted through the respective through-hole 104A; however, there is no limitation thereto. Namely, the leading end of the bolt 124 may be configured so as to be ordinarily disposed further toward the vehicle rear side than the through-hole 104A. In such cases, the bolts 124 are inserted through the respective through-holes 104 due to the rear bumper reinforcement 18 approaching the reinforcement members 72 under collision load in a rear-end collision.

Operation and Effects

Explanation follows regarding operation and effects of the second exemplary embodiment.

In the vehicle rear section structure 70 configured as described above, when a rear-end collision occurs, rear collision load input to the rear bumper reinforcement 18 is distributed and input to the left and right rear side members 14, and to the left and right reinforcement members 72 disposed at the vehicle width direction inner side of the left and right rear side members 14. The left and right reinforcement members 72 are disposed with their length directions along the vehicle front-rear direction at the vehicle rear side of the rear suspension member 22, with at least part of each of the respective front end portions overlapping the left and right load bearing sections 78 provided to the left and right side sections 22A of the rear suspension member 22 in vehicle front-rear direction view. The rear cross member 20 is interposed between the left and right reinforcement members 72 and the left and right load bearing sections 78.

Thus, the left and right reinforcement members 72 abut the left and right load bearing sections 78 of the rear suspension member 22 with the rear cross member 20 interposed therebetween, such that rear collision load is transmitted toward the vehicle front side through the left and right reinforcement members 72 and the left and right side sections 22A of the rear suspension member 22. The plural ridgeline sections 90, 92, 94, 96, 98, and 100 are formed extending in straight line shapes along the vehicle front-rear direction on the reinforcement members 72, such that rigidity against rear collision load is increased, thereby enabling rear collision load to be efficiently transmitted toward the vehicle front side. Thus, the present exemplary embodiment also enables similar excellent operation and effects to those in the first exemplary embodiment to be exhibited.

In the present exemplary embodiment, the left and right reinforcement members 72 have their respective front end portions supported by the rear cross member 20 through the front coupling brackets 74, and their respective rear end portions supported by the lower back 16 at the coupling tabs 88B of the rear plates 88. Configuration is thereby such that the left and right reinforcement members 72 are not joined to the rear floor pan rear section 12C, enabling the shape of the left and right reinforcement members 72 to be set irrespective of the shape of the rear floor pan rear section 12C. This enables the number of straight line shaped ridgeline sections formed to the left and right reinforcement members 72 to be increased compared to cases in which the left and right reinforcement members 72 are joined to the rear floor pan rear section 12C.

In the present exemplary embodiment, the respective reinforcement members 72 and the respective rear side member rear sections 14B positioned at the vehicle width direction outer sides of the reinforcement members 72 are coupled together by the left and right front coupling brackets 74 and the left and right rear coupling brackets 76. Thus, the respective rear side member rear sections 14B and the respective reinforcement members 72 are reinforced by each other, improving the rigidity of the vehicle body, and the improving steering stability of the vehicle. Moreover, the left and right rear side members 14 and the left and right reinforcement members 72 are less liable to deform in different directions to each other under rear collision load, thereby enabling the deformation mode of the vehicle rear section to be stabilized.

In the present exemplary embodiment, the respective rear end portions of the left and right reinforcement members 72 are positioned separated from and at the vehicle front side of the rear bumper reinforcement 18. The leading end sides of the bolts 124 projecting out from the rear bumper reinforcement 18 toward the respective rear end portion sides of the left and right reinforcement members 72 are inserted into the through-holes 104A formed to the rear plates 88 of the left and right reinforcement members 72. Thus, when another vehicle or the like (see the barrier B in FIGS. 24A and 24B) is in a rear-end collision with the rear bumper reinforcement 18, and the rear bumper reinforcement 18 is displaced toward the left and right reinforcement member side under collision load of the rear-end collision, the left and right bolts 124 are inserted even more deeply through the left and right through-holes 104A. This enables positional misalignment of the left and right reinforcement members 72 and the rear bumper reinforcement 18 due to rear collision load to be prevented or suppressed, thereby enabling rear collision load input to the rear bumper reinforcement 18 to be well transmitted to the left and right reinforcement members 72.

Namely, as in a Comparative Example 200 illustrated in FIGS. 25A and 25B, in a configuration that includes neither the bolts 124 nor the through-holes 104A, as illustrated in FIG. 25B, there is a possibility that the left and right reinforcement members 72 are pushed upward toward the vehicle upper side under collision load input to the rear bumper reinforcement 18 in a rear-end collision (see the arrow C in FIG. 25B). In such cases, efficiency of load transmission from the rear bumper reinforcement 18 to the left and right reinforcement members 72 is greatly reduced; however, the present exemplary embodiment enables this to be avoided. Note that the coupling tabs 88B of the rear plates 88, the bolts 106, and the nuts 108 are not illustrated in FIGS. 25A and 25B.

Moreover, since there is no need to couple or join the left and right reinforcement members 72 and the rear bumper reinforcement 18 together in order to suppress or prevent the above-described positional misalignment, the assembly operation of the left and right reinforcement members to the vehicle rear section is made easier. The above-described positional misalignment is prevented or suppressed by employing the fasteners 80 to fasten the lower back 16 and the rear bumper reinforcement 18 together, thereby enabling the configuration to be simplified.

In the present exemplary embodiment, the rear suspension member 22 includes the left and right load bearing sections 78 respectively projecting out toward the vehicle upper side from the left and right side section main bodies 77, these being the main bodies of the left and right side sections 22A. The respective front end portions of the left and right reinforcement members 72 overlap the left and right load bearing sections 78 in vehicle front-rear direction view. Thus, when the left and right reinforcement members 72 approach the left and right side sections 22A under rear collision load, the left and right reinforcement members 72 abut the left and right load bearing sections 78 with the rear cross member 20 interposed therebetween. Thus, rear collision load is transmitted from the left and right reinforcement members 72 to the left and right side sections 22A.

The left and right load bearing sections 78 project out from the left and right side section main bodies 77 toward the vehicle upper side. This enables load to be transmitted from the left and right reinforcement members 72 to the left and right side sections 22A, even, for example, in cases in which it is difficult to dispose the left and right reinforcement members 72 such that at least part of each of the respective front end portions of the left and right reinforcement members 72 overlaps the left and right side section main bodies 77 in vehicle front-rear direction view. This increases the degrees of freedom for placement of the left and right reinforcement members 72.

In the present exemplary embodiment, the left and right bulk members 82 provided inside the closed cross-section of the rear cross member 20 are interposed between the respective front end portions of the left and right reinforcement members 72 and the left and right load bearing sections 78 of the rear suspension member 22. Thus, when rear collision load input to the left and right reinforcement members 72 is transmitted to the rear suspension member 22 through the rear cross member 20, the left and right bulk members 82 can suppress the closed cross-section of the rear cross member 20 from being crushed. This enables the transmission efficiency of rear collision load through the rear cross member 20 to be improved.

Various Modified Examples of Second Exemplary Embodiment

Explanation follows regarding various modified examples of the second exemplary embodiment. Note that configuration and operation that are basically the same as that in the second exemplary embodiment are appended with the same reference numerals as in the second exemplary embodiment, and explanation thereof is omitted.

First Modified Example

Figure 26:
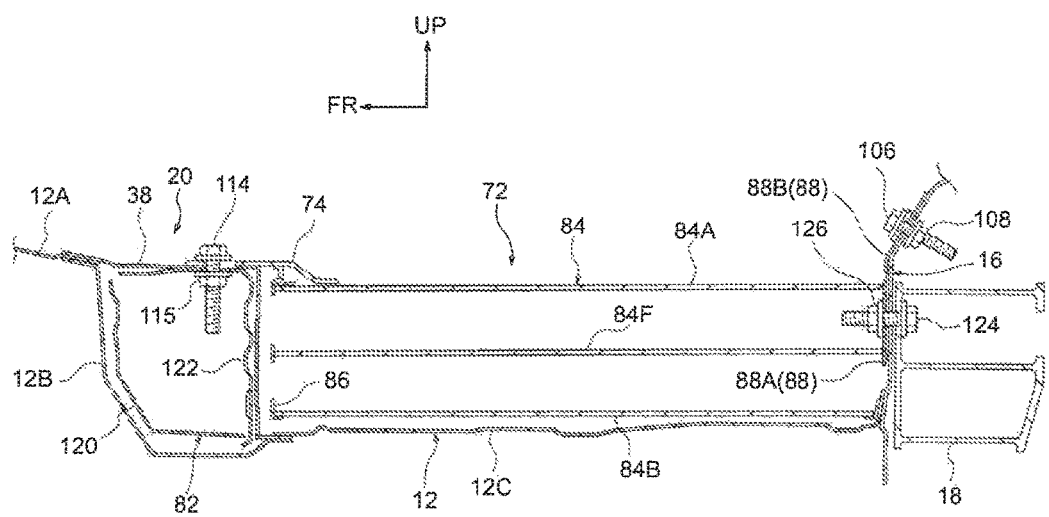
FIG. 26 is a cross-section corresponding to part of FIG. 17, illustrating configuration surrounding a reinforcement member according to a first modified example of the second exemplary embodiment.

FIG. 26 is a cross-section corresponding to part of FIG. 17, illustrating configuration surrounding a reinforcement member 72 according to a first modified example of the second exemplary embodiment. In the first modified example, the rear plates 88 of the left and right reinforcement members 72 (only the reinforcement member 72 at the vehicle left side is illustrated in FIG. 26) are fastened and fixed to the rear bumper reinforcement 18 by the bolts 124 and the nuts 126. In the first modified example, although the ease of assembly of the left and right reinforcement members 72 to the vehicle rear section is reduced compared to in the second exemplary embodiment, rear collision load input to the rear bumper reinforcement 18 can be transmitted to the left and right reinforcement members 72 at an earlier stage.

Second Modified Example

FIG. 27A is a cross-section schematically illustrating configuration surrounding a reinforcement member 72 according to a second modified example of the second exemplary embodiment, as viewed from the vehicle left side. FIG. 27B is a bottom view schematically illustrating configuration surrounding the reinforcement member 72 according to the second modified example, as viewed from the vehicle lower side. In the second modified example, the reinforcement members 72 are disposed at the vehicle lower side of the rear floor pan rear section 12C. The front end portions of the reinforcement members 72 are fixed to a lower face of the rear cross member 20 by bolt-fastening, and supported by the rear cross member 20. The rear end portions of the reinforcement members 72 are fixed to a front face of the lower back 16 by bolt-fastening, and supported by the lower back 16. In the second modified example also, at least part of each of the front end portions of the reinforcement members 72 is disposed so as to overlap the left and right side sections 22A of the rear suspension member 22 in vehicle front-rear direction view. The second modified example enables a luggage floor formed above the rear floor pan rear section 12C to be widened.

Third Exemplary Embodiment

Figure 28:
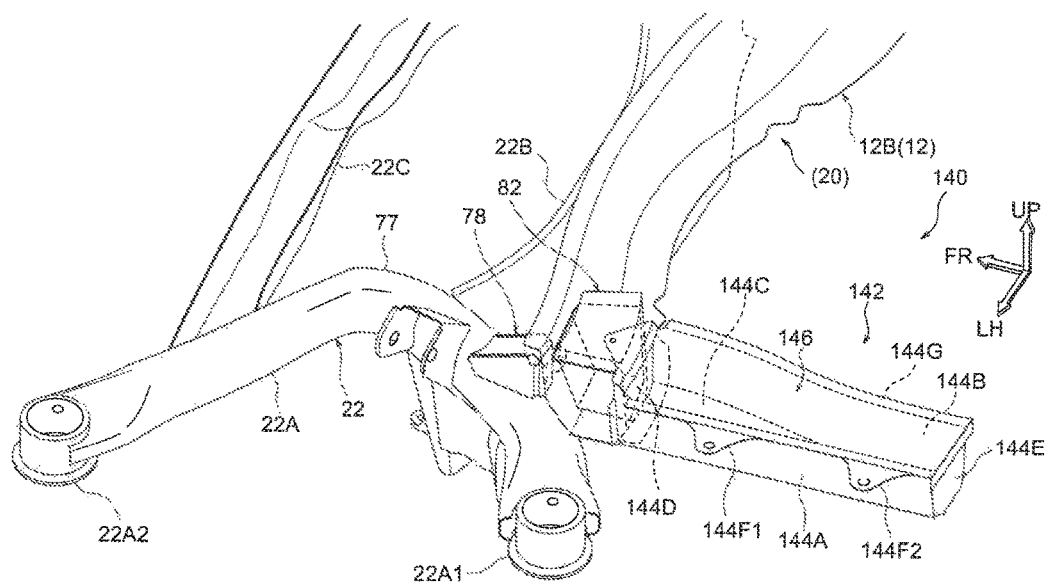
FIG. 28 is a perspective view illustrating partial configuration of a left half section of a vehicle rear section structure according to a third exemplary embodiment of the present disclosure, in a state viewed diagonally from the vehicle rear upper left side.
Figure 29:
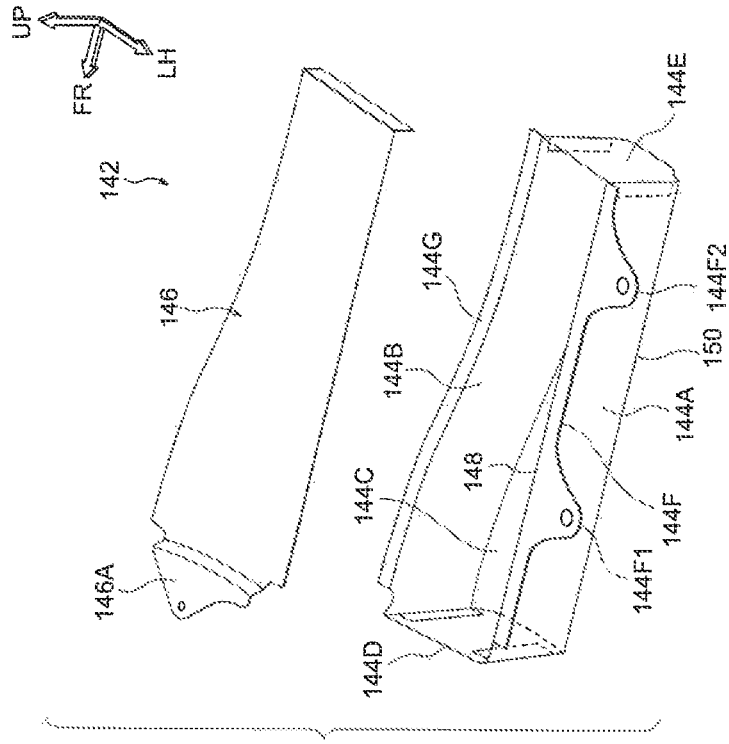
FIG. 29 is an enlarged perspective view of a reinforcement member according to the third exemplary embodiment.

Explanation follows regarding a vehicle rear section structure 140 according to a third exemplary embodiment of the present disclosure, with reference to FIGS. 28 and 29. In the present exemplary embodiment, although configuration of left and right reinforcement members 142 differs from the configuration of the reinforcement members 72 according to the second exemplary embodiment, other configuration is similar to that in the second exemplary embodiment. Thus, in FIG. 28, configuration that is basically the same as in the second exemplary embodiment is appended with the same reference numerals as in the second exemplary embodiment. The vehicle rear section structure 140 according to the present exemplary embodiment is configured with left-right symmetry, and so the vehicle right side is not illustrated in FIG. 28, and explanation regarding configuration of the vehicle right side is omitted. Note that in FIG. 28, the reference numeral 22C indicates a front cross member section of the rear suspension member 22, and the reference numeral 22A2 indicates a front end portion of each side section 22A.

As illustrated in FIGS. 28 and 29, the left and right reinforcement members 142 are each configured by a reinforcement member main body 144 and a lid member 146. The reinforcement member main body 144 and the lid member 146 are each formed of metal plate such as steel plate. The reinforcement member main body 144 is formed in a box shape open toward the vehicle upper side with its length direction along the vehicle front-rear direction. Specifically, the reinforcement member main body 144 includes left and right side wall sections 144A, 144B, a lower wall section 144C linking respective lower end portions of the left and right side wall sections 144A, 144B together in the vehicle width direction, a front wall section 144D linking respective front end portions of the left and right side wall sections 144A, 144B in the vehicle width direction, and a rear wall section 144E linking respective rear end portions of the left and right side wall sections 144A, 144B in the vehicle width direction.

The reinforcement member main body 144 also includes an outer flange 144F extending toward the vehicle width direction outer side from an upper end portion of the side wall section 144A at the vehicle width direction outer side, and an inner flange 144G extending toward the vehicle width direction inner side from an upper end portion of the side wall section 144B at the vehicle width direction inner side. A front and rear pair of coupling sections 144F1, 144F2 that project out toward the vehicle width direction outer side are provided to the outer flange 144F. Upper and lower pair of ridgeline sections 148, 150 that extend in straight line shapes along the vehicle front-rear direction are formed on the reinforcement member main body 144.

The ridgeline section 148 at the upper side is a bent section formed between the side wall section 144A and the outer flange 144F. The ridgeline section 150 at the lower side is a bent section formed between the side wall section 144A and the lower wall section 144C. These ridgeline sections (bent sections) 148, 150 bend at right angles or substantially at right angles as viewed from the vehicle front-rear direction, and extend along the vehicle front-rear direction. The ridgeline sections (bent sections) 148, 150 are formed from a front end portion across to a rear end portion of the reinforcement member main body 144. The rigidity of the reinforcement member main body 144 against load in the vehicle front-rear direction is improved by forming the ridgeline sections 148, 150.

The lid member 146 is formed in a flat plate shape with its length direction along the vehicle front-rear direction, and is overlapped with the upper side of the reinforcement member main body 144. Both vehicle width direction end portions of the lid member 146 are respectively joined by spot welding to the outer flange 144F and the inner flange 144G. A front coupling section 146A is formed extending toward the vehicle front side at a front end portion of the lid member. The front coupling section 146A is overlapped with the upper face of the upper wall section 38A (not illustrated in FIG. 28) of the rear cross member 20, and fixed to the rear cross member 20 by bolt-fastening. A front end portion of each reinforcement member 142 is thereby supported by the rear cross member 20. A rear end portion of each reinforcement member 142 is coupled to the lower back 16 (not illustrated in the drawings) through a non-illustrated bracket, or is directly fixed to the lower back 16 by bolt-fastening or the like, and is supported by the lower back 16.

The previously described coupling sections 144F1, 144F2 of each reinforcement member 142 are overlapped with the upper face of the rear side member rear section 14B (not illustrated in the drawings) positioned at the vehicle width direction outer side of each reinforcement member 142, and are fixed to the rear side member rear section 14B by bolt-fastening. Thus, each reinforcement member 142 is coupled to the rear side member rear section 14B positioned at the vehicle width direction outer side of each reinforcement member 142.

The reinforcement members 142 with the above configuration have a smaller number of "ridgeline sections extending in straight line shapes along the vehicle front-rear direction" than the reinforcement members 72 according to the second exemplary embodiment. Thus, rigidity against load in the vehicle front-rear direction is lower than that of the reinforcement members 72, but the reinforcement members 142 can be manufactured by metal plate alone and, therefore, manufacture is easier.

Supplementary Explanation of Exemplary Embodiments

The second exemplary embodiment and the third exemplary embodiment are configured such that at least part of each of the front end portions of the left and right reinforcement members 72, 142 overlaps the left and right load bearing sections 78 in vehicle front-rear direction view; however, the present disclosure is not limited thereto. Namely, configuration may be such that at least part of each of the front end portions of the left and right reinforcement members 72, 142 overlaps the left and right side section main bodies 77 in vehicle front-rear direction view. In such cases, the left and right load bearing sections 78 may be omitted.

In the second exemplary embodiment, the fasteners 80 that fasten the lower back 16 and the rear bumper reinforcement 18 together configure a "projection section" according to the present disclosure; however, the present disclosure is not limited thereto. For example, configuration may be such that a component configuring a projection section (such as a circular column shaped component) is fixed to the lower back 16.

Various other modifications may be implemented based on the present disclosure, Obviously, the scope of rights of the present disclosure is not limited by any of the above exemplary embodiments.

What is claimed is:
1. A vehicle rear section structure comprising:
left and right rear side members that are disposed with length directions along a vehicle front-rear direction at both vehicle width direction sides of a rear floor pan;
a rear bumper reinforcement that is disposed with a length direction along the vehicle width direction at the vehicle rear side of rear end portions of the left and right rear side members;

a rear suspension member that is disposed with length directions along the vehicle front-rear direction, and that is attached to respective front portions of the left and right rear side members;

a load bearing section that projects out toward a vehicle upper side from the rear suspension member;

left and right reinforcement members having length directions along the vehicle front-rear direction, the left and right reinforcement members being disposed at a vehicle width direction inner side of rear portions of the left and right rear side members and at a vehicle rear side of the rear suspension member, at least part of a rear end portion of the reinforcement member overlapping the rear bumper reinforcement in a vehicle front-rear direction view; and a rear cross member that links the left and right rear side members together in the vehicle width direction, at least part of the cross member overlapping the load bearing section in the vehicle front-rear direction view.

2. The vehicle rear section structure of claim 1, wherein the rear suspension member comprises left and right side portions attached to respective front portions of the rear side members, and the load bearing section project out toward the vehicle upper side from the left or right side portion.

3. The vehicle rear section structure of claim 1, wherein the load bearing section overlaps with at least part of a front end portion of the left or right reinforcement member.

4. The vehicle rear section structure of claim 1, wherein the reinforcement members are disposed above the rear floor pan.

5. The vehicle rear section structure of claim 1, wherein a main body of each of the reinforcement members forms a closed cross-section extending along the vehicle front-rear direction.

* * * * *